United States Patent
Narroschke

(10) Patent No.: US 12,356,011 B2
(45) Date of Patent: Jul. 8, 2025

(54) METHODS AND DEVICES FOR CODING IMAGE DATA

(71) Applicant: Hochschule RheinMain, Wiesbaden (DE)

(72) Inventor: Matthias Narroschke, Schaafheim (DE)

(73) Assignee: Hochschule RheinMain, Wiesbaden (DE)

( * ) Notice: Subject to any disclaimer, the term of this patent is extended or adjusted under 35 U.S.C. 154(b) by 267 days.

(21) Appl. No.: 18/012,072

(22) PCT Filed: Jun. 22, 2021

(86) PCT No.: PCT/EP2021/067009
§ 371 (c)(1),
(2) Date: Dec. 21, 2022

(87) PCT Pub. No.: WO2021/259935
PCT Pub. Date: Dec. 30, 2021

(65) Prior Publication Data
US 2023/0247226 A1    Aug. 3, 2023

(30) Foreign Application Priority Data

Jun. 22, 2020  (DE) .................... 10 2020 207 711.8

(51) Int. Cl.
*H04N 19/66*   (2014.01)
*H04N 19/176*  (2014.01)
*H04N 19/60*   (2014.01)

(52) U.S. Cl.
CPC ........... *H04N 19/66* (2014.11); *H04N 19/176* (2014.11); *H04N 19/60* (2014.11)

(58) Field of Classification Search
CPC ...... H04N 19/66; H04N 19/176; H04N 19/60; H04N 19/61
See application file for complete search history.

(56) References Cited

U.S. PATENT DOCUMENTS

| | | | |
|---|---|---|---|
| 2014/0050265 A1* | 2/2014 | Joshi .................... | H04N 19/147 375/240.12 |
| 2014/0184740 A1* | 7/2014 | Zhang .................. | H04N 19/503 348/43 |

FOREIGN PATENT DOCUMENTS

WO    2008110535 A1    9/2008

\* cited by examiner

*Primary Examiner* — Richard T Torrente
(74) *Attorney, Agent, or Firm* — The Webb Law Firm

(57) ABSTRACT

The present invention relates to methods and devices for coding image data, where a prediction error block is partitioned into an element-wise linear combination. The prediction error block contains prediction errors of a block of image data. The linear combination then contains a first block of first prediction errors and a second block of second prediction errors. The second block is transformed and coded together with the first block. The invention additionally relates to methods and devices for decoding image data, where a bit stream contains a first block of prediction errors and a transformed second block of second prediction errors. Following an inverse transform of the transformed second block, a prediction error block is determined by a linear combination containing the first block and the inverse-transformed second block.

12 Claims, 14 Drawing Sheets

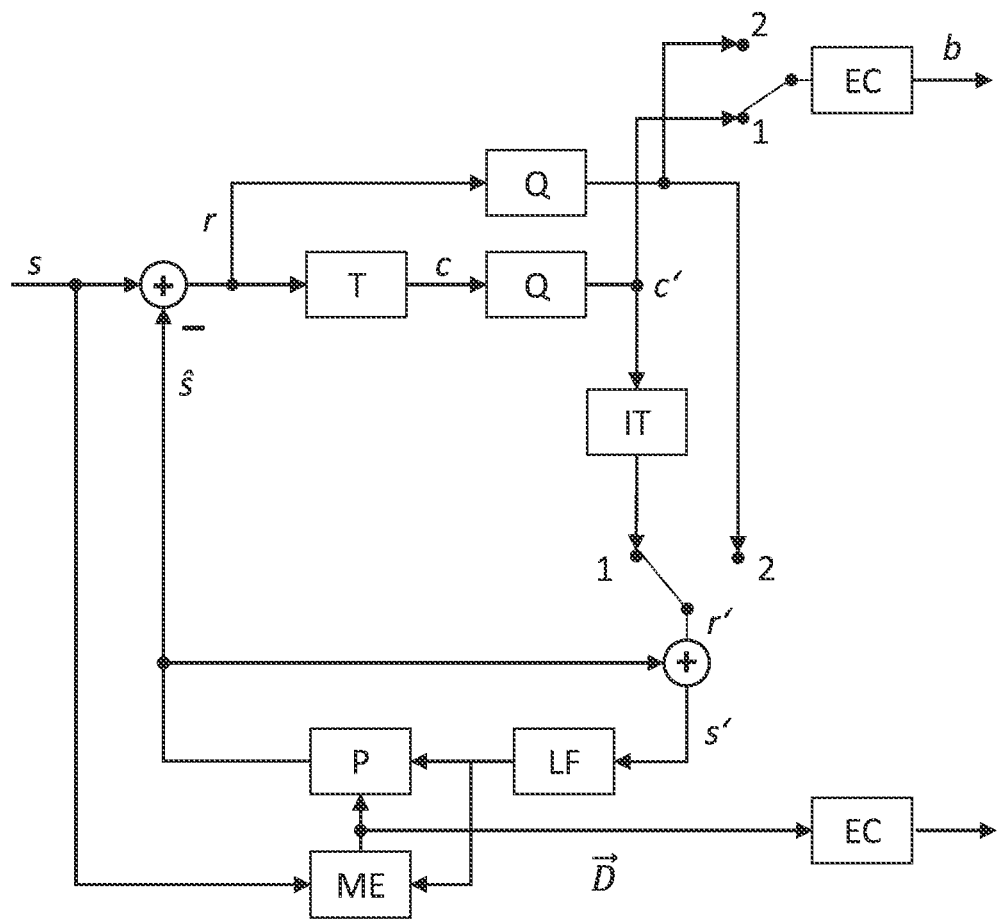
Fig. 1 – Prior Art

METHODS AND DEVICES FOR CODING IMAGE DATA

CROSS-REFERENCE TO RELATED APPLICATIONS

This application is the United States national phase of International Application No. PCT/EP2021/067009 filed Jun. 22, 2021, and claims priority to German Patent Application No. 10 2020 207 711.8 filed Jun. 22, 2020, the disclosures of which are hereby incorporated by reference in their entireties.

BACKGROUND OF THE INVENTION

Field of the Invention

The present invention relates to methods and devices for coding and decoding image data.

Description of Related Art

Methods and devices for coding and decoding image data, in particular video data, are used in a wide range of digital image/video processing and transmission. Examples of this are the broadcasting of a digital television program, image/video transmission via the Internet or mobile networks, real-time applications such as video conference systems, as well as storing and reading out image/video data on data carriers such as DVDs or Blu-rays.

The amount of data that is necessary to display a short-running video can be so large that difficulties in data transmission over networks with limited bandwidth can arise. Furthermore, the storage space available on a DVD or a Blu-ray disc may not be sufficient to store a certain video entirely.

For these reasons, image or video data is typically compressed before it is stored or transmitted over a network. Compression is typically performed at a data source that codes the image/video data using dedicated software or hardware prior to transmission or storage, whereby the amount of data required can be reduced. The compressed data is then received at the destination and decoded in order to be able to display, for example, the image or video transmitted.

SUMMARY OF THE INVENTION

As the desired image quality is constantly increasing, it is therefore desirable to improve the compression rate without having to accept significant losses in image quality. It is therefore the object of the present invention to improve the compression rate of image data in order to obtain a reduced data rate required or reduced memory requirement that is needed.

This object is satisfied by the disclosure herein, and includes advantageous embodiments.

According to a first aspect, the present invention relates to a method for coding image data. The method comprises determining a prediction error block containing prediction errors of a block of the image data. The method furthermore comprises partitioning the prediction error block into a linear combination that comprises a first block of first prediction errors and a second block of second prediction errors. The method furthermore comprises transforming the second block as well as coding the first block and the transformed second block.

In other words, the invention relates to a method for coding image data, where a prediction error block is not necessarily directly transformed and quantized or directly quantized, respectively, before it is coded, but is divided into a linear combination containing two blocks, the first block and the second block. That means that the prediction error block results from the linear combination, including the two blocks. Subsequently, only one of the two blocks, the second block, is transformed in order to obtain a transformed second block. The first block, however, is not transformed. The non-transformed first block and the transformed second block are then coded.

At least one prediction error is obtained by a linear combination of a first non-zero prediction error and a second non-zero prediction error.

The coding can contain a quantization of the first block and the transformed second block. Furthermore, the coding can include entropy coding of the (possibly quantized) first block and the (possibly quantized) transformed second block.

The image data can represent a still image, a moving image (i.e., video), or a sequence of still or moving images. The method can be carried out on a block basis, where each block contains a portion of an image to be coded. The blocks can contain image point values, pixel values, image sampling values or the like.

The method according to the first aspect makes it possible to reduce the data rate required for coding the prediction errors without reducing the quality of the coded image.

According to one embodiment, the first prediction errors have lower statistical dependencies among each other than the second prediction errors.

In other words, a statistical dependence of the first prediction errors of the first block on each other can be lower than a statistical dependence of the second prediction errors of the second block on each other.

This allows the required data rate to be reduced, since the coding methods are adapted to the respective statistical properties of the prediction errors. This means that the portion of prediction errors that has a low statistical dependence can be coded without transform, which entails an improved data rate than coding with transform. Similarly, the portion of prediction errors that has a higher statistical dependence can be coded with transform, which entails an improved data rate than coding without transform.

According to a further embodiment, the sum of the first prediction errors and the second prediction errors yields the corresponding prediction errors of the prediction error block.

In other words, the sum of a specific first prediction error of the first block and of the corresponding second prediction error of the second block yields the corresponding prediction error of the prediction error block. This can apply to all prediction errors of the first, the second, and the prediction error block. This means that, on a pixel basis, the sum of the first prediction errors and the second prediction errors yields the prediction errors of the prediction error block.

This allows for the prediction errors to be fully coded. In other words, if the linear combination represents a sum of the first block and the second block that specifies the prediction error block, all the prediction errors are coded.

According to a further embodiment, the prediction error block, the first block, and the second block each have the same size.

The same size of the first block and the second block allows for direct determination of the prediction error block on a coder side. Complex address management and/or assignment or determination of the individual prediction errors of the first and the second block is therefore not necessary. However, the present invention can also support blocks of different sizes.

According to a further embodiment, the partitioning of the prediction error block includes minimizing a sum of the absolute values of the first prediction errors of the first block.

In other words, with the partitioning, the sum of the absolute values (i.e. the amounts) can include a minimization of the first prediction errors. It is not absolutely necessary for the partitioning to achieve the theoretically best possible minimization.

Since the absolute values of the prediction errors can be regarded as a measure of the data rate required for coding, the data rate required for coding is minimized in a simple manner by minimizing the absolute values.

According to a further embodiment, the partitioning of the prediction error block includes a minimization of a sum of the absolute values of the transformed prediction errors of the transformed second block.

In other words, with the partition, the sum of the absolute values (i.e. the amounts) can include a minimization of the transformed second prediction errors. It is not absolutely necessary for the partitioning to achieve the theoretically best possible minimization.

Since the absolute values of the transformed prediction errors can be regarded as a measure for the data rate required for coding the transformed second block, the data rate required for coding is minimized in a simple manner by minimizing the absolute values.

According to a further embodiment, the method further comprises inserting the coded first block and the coded transformed second block into a bit stream. The method further comprises inserting into the bit stream an indicator capable of indicating that the bit stream contains the coded first block and the coded transformed second block.

This means that it can be indicated by inserting the indicator into the bit stream that the bit stream contains the first block and the transformed second block.

This can enable, for example, a decoding side to be informed that or whether the bit stream contains the first block and the transformed second block.

The insertion of the indicator into the bit stream enables, for example, dynamic activation and deactivation of the partitioning of the prediction error block into a first prediction error of the first block and the corresponding second prediction error of the second block. In addition, the indicator does not have to estimate during decoding whether the prediction error block has been partitioned, which in turn leads to a reduction in the computing capacity required.

According to a preferred embodiment, the indicator is further capable of indicating that the bit stream contains only the coded first block, only the coded transformed second block, or none of the coded first block and the coded transformed second block.

In other words, the indicator can indicate that the bit stream contains only the first block. Furthermore, the indicator can indicate that the bit stream contains only the transformed second block. Furthermore, the indicator can indicate that the bit stream contains both the first block as well as the transformed second block. In addition, the indicator can indicate that the bit stream contains neither the first nor the second block.

This allows for a single indicator not only being able to indicate that the bit stream contains the first and the transformed second block, but also being used to indicate other coding methods.

According to a second aspect, the present invention also relates to a method for decoding image data. The method comprises receiving a bit stream containing a coded first block of first prediction errors and a coded transformed second block of second prediction errors. The method furthermore comprises decoding the first block and the transformed second block as well as inverse-transforming the transformed second block. Furthermore, the method comprises determining a prediction error block, containing prediction errors of a block of the image data, by a linear combination containing the first block and the inverse-transformed second block.

In other words, the invention relates to a method for decoding image data, where two blocks are received and decoded (the first block and the transformed second block) instead of a single, possibly transformed, prediction error block. The prediction error block then results from a linear combination containing the first block and the inverse-transformed second block.

With the method according to the second aspect, a prediction error of a block of the image data that was coded with a reduced data rate can be obtained without reducing the quality of the coded image.

According to one embodiment, the linear combination contains a sum of the first block and the inverse-transformed second block.

In other words, the sum of a specific first prediction error of the first block and the corresponding second prediction error of the inverse-transformed second block yields the corresponding prediction error of the prediction error block. This can apply to all prediction errors of the first, of the inverse-transformed second, and of the prediction error block.

This means that on a pixel basis, the sum of the first prediction errors and the second prediction errors yields the prediction errors of the prediction error block.

This allows for the prediction errors to be fully obtained. In other words, if the linear combination represents a sum of the first block and the inverse-transformed second block that specifies the prediction error block, all the prediction errors are decoded.

According to a further embodiment, the method further comprises determining that the bit stream contains the coded first block and the coded transformed second block.

This means that prior to the prediction error block being determined by the linear combination, it can be determined that the bit stream contains the first block and the transformed second block.

According to a further embodiment, the bit stream contains an indicator capable of indicating that the bit stream contains the coded first block and the coded transformed second block. Furthermore, it is determined based on the indicator that the bit stream contains the coded first block and the coded transformed second block.

In other words, the indicator can indicate whether or not the bit stream contains said blocks. In dependence of whether the indicator indicates that said blocks are present in the bit stream, the first block and the transformed second block can be decoded and further processed.

The indicator enables, for example, dynamic activation and deactivation of the method with the partitioning of the prediction error block. In addition, the indicator does not have to estimate during decoding whether the prediction error block has been partitioned, which in turn leads to a reduction in the computing capacity required.

According to a specific embodiment, the indicator is capable of indicating that the bit stream contains only the coded first block, only the coded transformed second block, both the coded first block and the coded transformed second block, or none of the coded first block and the coded transformed second block. Furthermore, the linear combination comprises a weighted sum of the first block and the second block, where weights of the weighted sum are determined based on the indicator.

This means that the indicator is not only able to indicate that the first block and the transformed second block are contained in the bit stream, but also whether only the first block, only the transformed second block, and/or neither of them is present in the bit stream.

This allows for a single indicator not only being able to indicate that the bit stream contains the first and the transformed second block, but also being used to indicate other coding methods.

According to a third aspect, the present invention furthermore relates to a device for coding image data, where the device comprises a unit for determining a prediction error block containing prediction errors of a block of the image data. The device furthermore comprises a unit for partitioning the prediction error block into a linear combination containing a first block of first prediction errors and a second block of second prediction errors. Furthermore, the device comprises a unit for transforming the second block and a unit for coding the first block and the transformed second block.

According to a fourth aspect, the present invention further relates to a device for decoding image data, where the device comprises a unit for receiving a bit stream containing a coded first block of first prediction errors and a coded transformed second block of second prediction errors. The device further comprises a unit for decoding the first block and the transformed second block, a unit for inverse-transforming the transformed second block, and a unit for determining a prediction error block, containing prediction errors of the block of image data, by a linear combination containing the first block and the second block.

The present invention furthermore relates to a device for coding image data comprising a processor which is configured to carry out a method according to the first aspect and/or its embodiments.

The present invention furthermore relates to a device for decoding image data comprising a processor which is configured to carry out a method according to the second aspect and/or its embodiments.

According to an advantageous embodiment, a computer program stored on a storage medium is provided which, when executed by one or more processors, carries out the steps of one of the above-mentioned methods.

Additional advantages and benefits of the present invention shall become apparent from the detailed description of a preferred embodiment and the drawings.

BRIEF DESCRIPTION OF THE DRAWINGS

FIG. 1 schematically shows an example of an implementation of a coding device according to prior art.

DESCRIPTION OF THE INVENTION

Figure 2A:
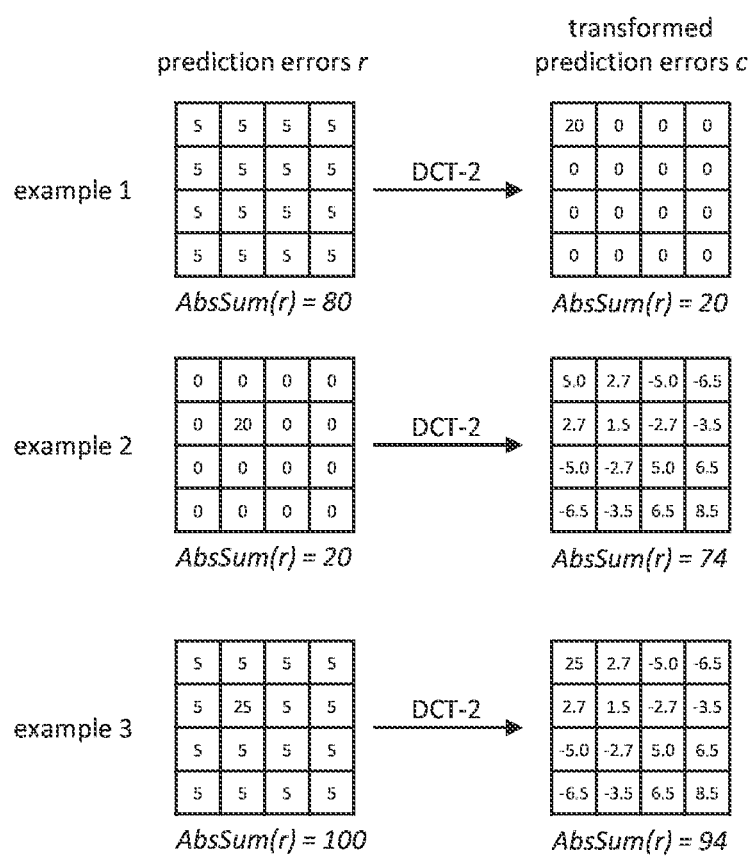
FIG. 2A shows examples of prediction error blocks with their transformed prediction error blocks together with a measure for the data rate required for coding.

In the following, embodiment of the present invention shall be described in detail with reference to the drawings.

Video coding standards are typically based on so-called hybrid coding, implemented, for example, in the standards MPEG-1 (ISO/IEC 11172 (MPEG-1), "Information technology—coding of moving images and associated audio for digital storage media at up to about 1.5 mbit/s", 1992), MPEG-2 (ITU-T Recommendation H.262 and ISO/IEC 13818-2 (MPEG-1), "Information technology—Generic coding of moving images and associated audio information", 1995), H.264/AVC (ITU-T Recommendation H.264 and ISO/IEC 14496-10 (MPEG-4) AVC, "Advanced Video Coding for Generic Audiovisual Services", 2019), HEVC (ITA-T Recommendation H.265 and ISO/IEC 23008-2, "High Efficiency Video Coding", 2019) and VVC (B. Bross et al.: "Versatile Video Coding (Draft 8)" Document JVET-Q2001, 17th meeting of the Joint Video Experts Team (JVET), Brussels, 2020. The disclosures of each of these standards is hereby incorporated by reference herein.

FIG. 1 shows a schematic block diagram of an example of a prior art device for image coding according to HEVC and the emerging VVC standard. The device comprises an input, a unit for determining prediction errors, a unit T for transform, units Q for quantization, a unit IT for inverse transform, a unit for reconstruction, a loop filter unit LF, a unit P for prediction, a unit ME for motion estimation, and units EC for entropy coding.

The unit for determining prediction errors, unit T for transform, and units Q for quantization can be considered to be units performing forward processing of the image signal, whereas the unit for reconstruction, unit IT for inverse transform, unit P for Prediction can be viewed to be units of backward processing. These units for backwards processing correspond to the units implemented in a device for decoding image data.

Images and Image Division

The encoder receives an image or image data via the input. For example, the encoder receives a series of images that together form a series of images or a section of video. An image can be viewed as a two-dimensional field (array) or matrix of image points, pixels, or sampling values, each of which is assigned a brightness and/or color value. The number of image points in the image defines the size and/or resolution of the image. Three components are commonly used to represent color. This means that the image can be represented in the form of three matrices. In the so-called RGB format, an image contains matrices that each contain a red, green, and blue value of their image points. However, the so-called YCbCr color space is typically used and contains a luminance Y and two chrominance values Cb and Cr. The luminance component Y reproduces a brightness or a gray value, whereas the two chrominance values Cb and Cr contain the chrominance or color information.

The encoder can contain a dividing unit that divides the image into a plurality of blocks. These blocks are also referred to as "root blocks", macro blocks, coding tree blocks, or coding tree units. The dividing unit can use the same size for all blocks or change the block size within an image. Blocks can themselves again be regarded as two-dimensional arrays (matrices) of intensity and color values. Coding of an image can be on a block basis. This means that the blocks of an image can be coded separately and sequentially, or in parallel.

Prediction Error Determination

The unit for determining prediction errors can be configured to determine a prediction error block r based on an image block s and a prediction block ŝ. This can be done, for example, by calculating the difference between image block s and prediction block ŝ, as shown in FIG. 1.

Transform

Unit T for transform can be configured to perform a transform such as a discrete cosine transform (DCT) or a discrete sine transform (DST) of the prediction error block in order to obtain a transformed prediction error block c.

In the example shown in FIG. 1, the transform is not necessarily carried out for each prediction error block of the image. Rather, it can be decided whether the transform is carried out or not, as described further below.

The encoder can be configured, for example, to output parameters that were used for the transform, for example, via the unit EC for coding, so that, for example, a decoder can receive the parameters and use them for inverse transform.

Quantization

Units Q for quantization quantize the transformed or non-transformed prediction error blocks, for example, by performing scalar or vector quantization. The quantization process can reduce the required bit depth by rounding the prediction errors. Quantization is lossy coding.

Inverse Quantization

The encoder can contain a unit for inverse quantization which can be upstream of the unit for inverse transform. Inverse quantization is performed in the unit for inverse quantization by performing a process inverse to the process used by unit Q for quantization. The resulting block contains prediction errors which correspond to the prediction errors of transformed c or non-transformed r prediction error block, although they are not necessarily identical to them due to quantization losses.

Inverse Transform

Unit IT for inverse transform carries out an inverse transform of the transform carried out by unit T for transform. As can be seen from FIG. 1, the inverse transform is carried out only when prediction error r has actually been transformed by unit T for inverse transform, i.e. when transformed prediction error block c has been generated. In the following, elements of the transformed prediction error block are referred to as transformed prediction errors or also as coefficients.

Reconstruction

The unit for reconstruction adds prediction block ŝ and quantized prediction error block r or transformed, quantized, and inverse-transformed prediction error block r' to obtain a reconstructed block.

Filtering

Loop filter unit LF filters the reconstructed block to obtain a filtered reconstructed block. The filtering can smooth image point transitions or improve the image quality in some other way. The loop filter unit can there apply one or more filters, for example, for deblocking or for suppressing noise.

Prediction

Unit P for prediction carries out a prediction of the block. This is done, for example, by inter-prediction or by inter-prediction.

Intra prediction is used to remove correlations or other statistical dependencies within a local area of an image. The basic assumption is that an area within an image is similar to neighboring areas of the same image and can therefore be inferred from the neighboring image areas. Intra-prediction can be applied when no images are available for inter-prediction or when intra-prediction is more efficient than inter-prediction. Neighboring sampling values that are disposed above or to the left of the current block are typically used for the prediction. The sampling values are combined to obtain, for example, a directional or a non-directional (planar) prediction.

The basic assumption of inter-prediction is that the content of several images in a series of images changes mainly due to the motion of the content of the images. There are therefore only slight differences from image to image which can mainly be traced back to a motion within the image. This motion can be used to represent the content of a current block as a motion vector and a prediction error. The motion vector indicates how areas of a reference image are to be shifted in order to obtain a prediction of the current image. The description of the motion with a motion vector is a translational mapping model which is based on a translational motion. In addition, the motion can also be described by other motion models, such as an affine or a perspective mapping model. More than two motion parameters are required for this, e.g. 6 for the affine model or 8 for the perspective model. In this way, for example, rotations can also be described.

In order to carry out inter-prediction, it is necessary to determine the motion parameters, such as the motion vectors. This can be carried out by the unit ME for motion estimation. The estimation can there be carried out by finding the greatest match between the content of a current block of the image and an area in the reference image. For example, the prediction block position can be shifted for this purpose to a search area of the reference image and the position of greatest matching can be found according to a predetermined cost criterion.

Entropy Coding

The intra- or interprediction allows for correlations and/or other statistical dependencies within the image or among images in a series of images to be removed. Forming the difference between prediction block ŝ and image block s yields the prediction error block containing the portion of original image block s that cannot be mapped by the prediction. Although the prediction reduces the correlation and/or other statistical dependencies in the prediction error block, the information contained therein can be further compressed by the transform described above.

The quantized prediction error block or the quantized transformed prediction error block, respectively, are coded together with information (side information) via the prediction method used, the motion vectors, intra-prediction directions, and similar necessary information by the unit EC for entropy coding to form a bit stream b. With entropy coding, the data is converted into binary code. Entropy coding represents lossless coding.

Decoding

A decoder receives the coded image data and decodes it to obtain the image data received. The image data can be received in a bit stream b containing information for decoding the coded image data, such as data representing a block of a coded video and associated side information.

The decoder there comprises a unit for entropy decoding, a unit for inverse transform, and a unit for reconstruction. In addition, the decoder comprises a loop filter unit, a unit for prediction, and possibly a unit for motion estimation.

The unit for inverse transform, the unit for reconstruction, and the loop filter unit can be identical in their function to the corresponding units of the encoder. The respective above descriptions therefore also apply to the units of the decoder mentioned.

The unit for entropy decoding is configured to carry out entropy decoding of the data contained in a bit stream for obtaining quantized image data (e.g. prediction errors), coding parameters, prediction parameters, transform parameters, quantization parameters, and/or loop filter parameters. The unit for entropy decoding can then be configured to carry out decoding in correspondence to the entropy coding carried out by the encoder. The decoder can receive the image data on a block basis.

The decoder can contain a unit for inverse quantization which can be upstream of the unit for inverse transform. Inverse quantization is performed in the unit for inverse quantization by carrying out a process inverse to the process used by unit Q for quantization of the encoder. The operations of inverse quantization can also be viewed as part of entropy decoding. For example, in the case of uniform quantization, the number of the quantization step in inverse quantization can be multiplied by the step width to obtain the representative value.

The unit for inverse transform carries out an inverse transform of the transform performed by unit T for transform of the encoder.

The unit for reconstruction can be configured to add a prediction block and a decoded prediction error block in order to obtain a reconstructed block.

The loop filter unit filters the reconstructed block to obtain a filtered reconstructed block. The filtering can smooth image point transitions or improve the image quality in some other way. The loop filter unit can there apply one or more filters, for example, for deblocking or for suppressing noise.

The unit for prediction carries out a prediction of the block. This is done, for example, by inter-prediction or by inter-prediction. In order to carry out inter-prediction, it is necessary to determine the motion vectors. This can be done by the unit for motion estimation. The estimation can there be carried out by finding the greatest match between the content of a current block of the image and an area in an already decoded reference image. For example, the prediction block position can be shifted to a search area of the reference image and the position of the greatest match can be found according to a predetermined cost criterion.

Both an encoder as well as a decoder can also contain a buffer for decoded images (DPB). It can be implemented, for example, by a memory containing reference images or, in general, reference image data. The buffer can be configured to store one or more previously filtered blocks. The buffer can also contain other previously filtered blocks, such as previously reconstructed and filtered blocks of the same image or different images (previously reconstructed and/or partially reconstructed images). The buffer can also store one or more unfiltered reconstructed blocks.

The High Efficiency Video Coding (HEVC) standard as well as the emerging Versatile Video Coding (VVC) standard are based on hybrid coding in which prediction and subsequent coding of the prediction error are applied. As described above, a transform of the prediction error blocks can be performed. For example, a Separable Discrete Cosine Transformation (DCT-2) can be applied and resulting transformed prediction errors c can be quantized, coded, and transmitted to a receiver.

However, the transform can increase the data rate, which occurs in particular with prediction error blocks whose prediction errors have a low statistical dependence or correlation. For this reason, a mixed method can be used in which high correlation prediction error blocks are transformed prior to quantization, whereas low correlation prediction error blocks are quantized without prior transform.

This procedure is shown in FIG. 1, in which prediction error block r is either supplied by unit T for transform to a unit Q for quantization, or is supplied to a unit Q for transform without prior transform. This procedure is defined in the HEVC standard having the name Transform Skip and will be adopted in the upcoming VVC standard with some extensions.

One way of estimating the necessary data rate of a prediction error block is provided by the assumption that prediction errors r with their variance $\sigma_r$ and the quantization step width $\Delta$ of a prediction error block follow a Laplace distribution. The probability of a prediction error r can therefore be estimated by $$P(r) = \frac{\Delta}{\sqrt{2}\sigma_r} e^{-\frac{\sqrt{2}|r|}{\sigma_r}}$$

With this probability assumption, a linear relationship arises between the absolute value of r and the information content), which follows the logarithm of the probability) and specifies the minimum data rate for coding n $$I(r) = -\log_2(P(r)) = \frac{1}{\ln(2)}\left(\frac{\sqrt{2}|r|}{\sigma_r} - \ln\left(\frac{\Delta}{\sqrt{2}\sigma_r}\right)\right)$$

The sum of the absolute values (amounts) of all prediction errors of a prediction error block can therefore be used as a measure for the data rate that is required to code the prediction error block.

The sum of all absolute values of a prediction error block is referred to hereafter as AbsSum(r) and represents an estimate of the required data rate for coding a prediction block.

FIG. 2A is a representation of two prediction error blocks by way of example, where example 1 shows a high correlation prediction error block, example 2 shows a low correlation prediction error block, and example 3 shows a medium correlation error block. In addition, FIG. 2A shows the transformed prediction error blocks for the three examples using a DCT-2 transform. Furthermore, FIG. 2A shows AbsSum for each prediction error block and each transformed prediction error block.

It can be seen that the AbsSum value for example 1 is reduced from 100 to 20 by the transform. This means that the required bit rate can be significantly reduced by applying the transform.

In contrast, FIG. 2A shows that the transform of the prediction error block in example 2 increases the AbsSum value from 20 to 74. The transform therefore leads to an increase in the required bit rate.

In Example 3, the AbsSum value decreases slightly from 100 to 94 by applying the transform. The advantage, i.e. the reduction in the bit rate required for coding that results from applying the transform to the prediction error block of example 3 is relatively small.

According to the method of an embodiment of the present invention, the prediction block is divided into a linear combination containing a first block $r_1$ and a second block $r_2$. Second block $r_2$ is transformed in order to obtain a transformed second block $c_2$. First block $r_1$ and transformed second block $c_2$ are then coded and can be transmitted to the recipient.

In an advantageous embodiment, prediction block r can result as the sum of first prediction block $r_1$ and second prediction block $r_2$:

$r=r_1+r_2$

In other words, the sum of first prediction errors of the first block and corresponding second prediction errors of the second block yield the prediction errors of the original prediction error block.

Figure 2B:
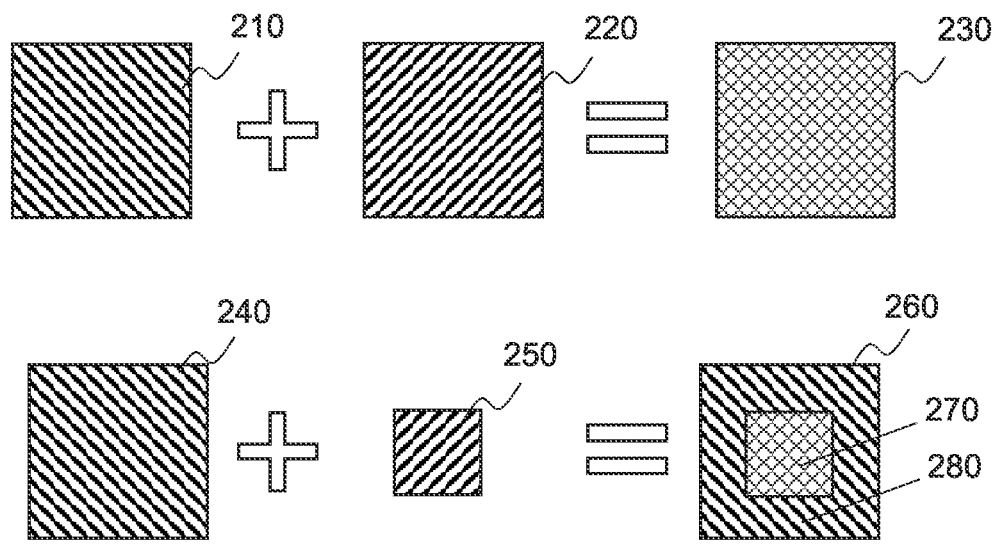
FIG. 2B is a schematic representation of a partitioning of two blocks of the same size and of two blocks having different sizes.

The sum mentioned above is an element-wise sum. If blocks $r_1$ and $r_2$ have the same size, then for each element (i,j) of the prediction block r the following holds: $r(i, j)=r_1(i, j)+r_2(i, j)$, where, $r_1(i, j)$ and $r_2(i, j)$ are the respective elements of the first and the second block, and i and j are indices of rows and columns of the blocks, respectively. The upper part of FIG. 2B schematically shows two blocks 210 and 220 of equal size and the resulting prediction block 230 which is obtained by the summation of blocks 210 and 220.

However, first block $r_1$ and second block $r_2$ need not have the same size. If the two blocks have different sizes, one or more prediction errors (elements of the prediction block) will be calculated as a sum of a non-zero element $r_1(i1, j1)$ of the first block and a non-zero element $r_2(i2, j2)$ of the second block. The lower part of FIG. 2B schematically shows two blocks 240 and 250 of equal size and the resulting prediction block 260 which is obtained by the summation of blocks 250 and 240. Reference character 270 shows the overlapping area of the two blocks in which they each have elements. The remaining area 280 is filled with values of the elements of block 240. The central position of overlapping portion 270 is just a non-restricting example. In general, the position of the overlapping portion can be defined arbitrarily. For a simplified implementation, it can be helpful to choose the width ratios and/or the height ratios of the two blocks in such a way that the width of the large block corresponds to an integer multiple of the width of the small block and/or the height of the large block corresponds to an integer multiple of the height of the small block. Furthermore, for simplifying the implementation, it can be useful to restrict the positioning of the smaller block relative to the larger block to horizontal positions that are multiples of the width of the small block and/or to restrict to vertical positions that are multiples of the height of the small block.

Different block sizes can be important inter alia where the size of the blocks for which the transform is carried out is different from the size of the blocks for which the prediction is carried out—in other words: where the transform blocks have a different size than the prediction blocks (at least in one of the dimensions).

In an exemplary embodiment, the smaller (250) of the two blocks (240, 250) can be zero-padded to the size of the larger (240) of the two blocks. Then the element-wise sum of such equally sized blocks can be computed as mentioned above. The present invention is not restricted to any particular implementation of the sum. If one of the elements to be summed up has the value zero, the sum does not need to be calculated, but can in fact be calculated—both lead to the same result.

In summary, the partitioning of prediction block r into blocks $r_1$ and $r_2$ is carried out such that the element-wise sum of blocks $r_1$ and $r_2$ contains at least one sum of elements that are both non-zero.

In one embodiment, first block $r_1$ can contain the portion of the prediction errors of the prediction error block that has a low statistical dependence or correlation. In a similar way, second block $r_2$ can contain the portion of the prediction errors of the prediction error block that has a higher statistical dependence or correlation. In particular, the statistical dependence or correlation of the prediction errors of first block $r_1$ can be lower than the statistical dependence or correlation of the prediction errors of second block $r_2$.

However, the present invention is not restricted to the sum of the first block and the second block as a linear combination.

According to one embodiment, the prediction error block can result from the sum of three summands.

$r=r_1+r_2+d$

Third summand d can contain, for example, quantization errors that result from a quantization of the first block and/or the second block.

According to one embodiment, the second block can be divided again into a new second block and a third block, where the new second block and the third block are transformed, but with different transforms. For example, the new second block can be transformed according to DCT-2 and the third block according to DCT-8 or DST-7. The division of the second block into the new second block and the third block can be done by minimizing the absolute values of the respectively transformed blocks (new second block and third block).

Figure 3:
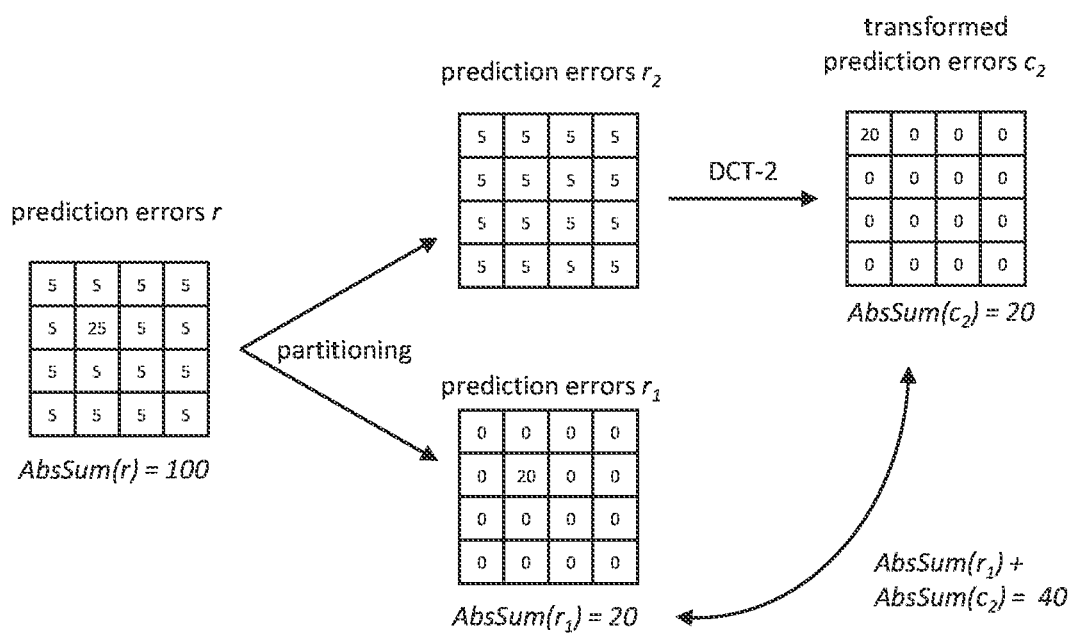
FIG. 3 shows an example of a partitioning of a prediction block, containing prediction errors of a block, into a linear combination containing a first block and a second block together with a measure for the data rate required for coding.

FIG. 3 shows this procedure using example 3 from FIG. 2A. Prediction error block r is partitioned into a first block $r_1$ and a second block $r_2$, where the sum of the prediction errors in first block $r_1$ and the corresponding prediction errors in second block $r_2$ yield the prediction errors of original prediction error block r. Second prediction error block $r_2$ is transformed to obtain transformed second prediction error block $c_2$. It is evident from FIG. 3 that the sum of the values AbsSum for $r_1$ and $c_2$ yields 40. This value is significantly below the AbsSum value of prediction error block rand also below the AbsSum value of the transformed prediction error block, as is obtained, for example 3, in FIG. 3 by the transform without partitioning.

This means that the data rate required for coding can be significantly reduced by partitioning a prediction error block into two blocks whose correlation of the prediction errors differ, and transforming only the block with higher correlation.

Figure 4:
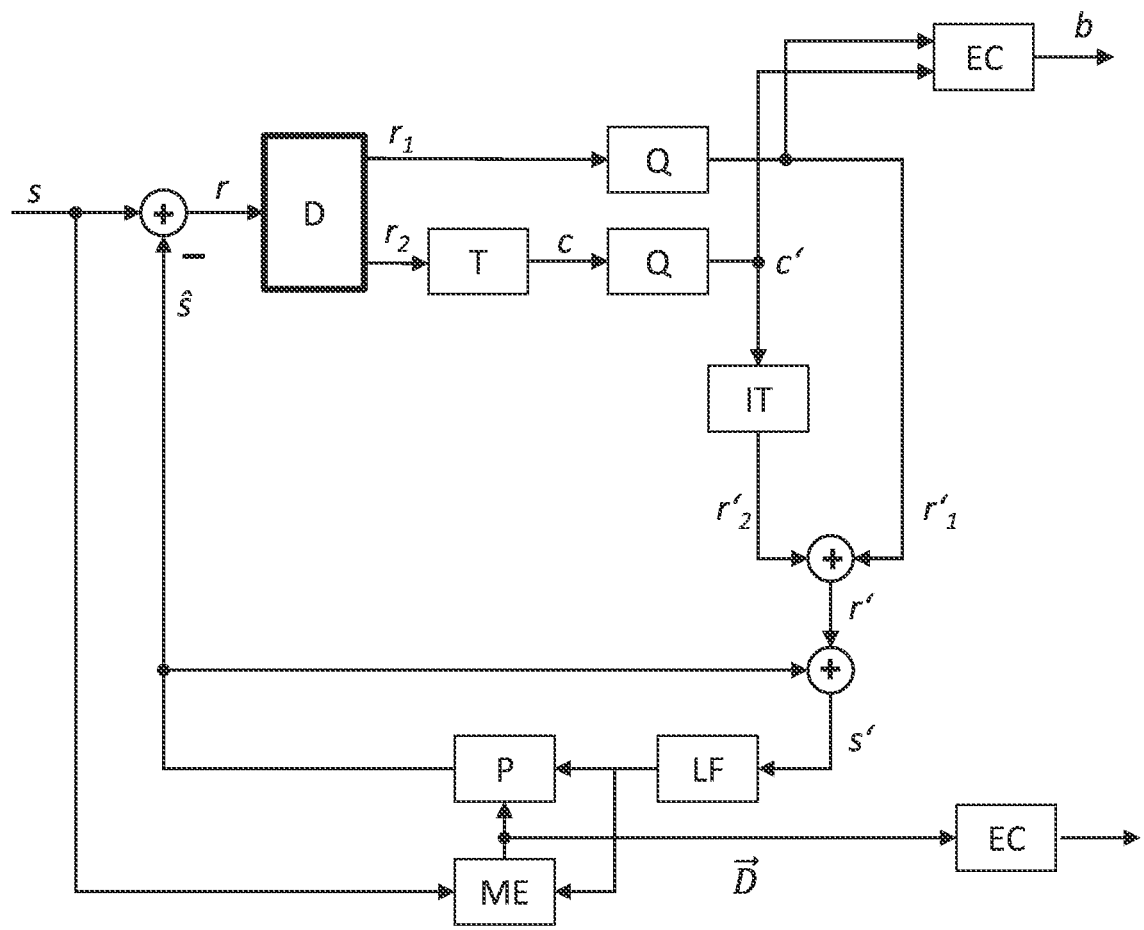
FIG. 4 schematically shows an example of an implementation of a coding device according to an embodiment.

An encoder according to one embodiment is shown in FIG. 4. The functions of the units correspond to the units of the encoder shown in FIG. 1 with the same designation. The encoder of the embodiment differs from the encoder shown in FIG. 1 in particular by the additional unit D for partitioning prediction block r into first block $r_1$ and second block $r_2$ First block $r_1$ is fed directly to unit Q for quantization, whereas second block $r_2$ is first transformed by unit T for transform before transformed second block c is fed to unit Q for quantization. Both of the quantized blocks, i.e., directly quantized block $r_1$ and quantized transformed block c', are coded by unit EC for entropy coding. Inverse-transformed prediction error block r' results from the sum of inverse-transformed first block $r'_2$ and the quantized first block. Before summation, an inverse quantization of both blocks can be performed as described above. However, unit D can also work in such a way that either $r_1$ or $r_2$ is zero. It therefore includes the encoder shown in FIG. 1.

Figure 5:
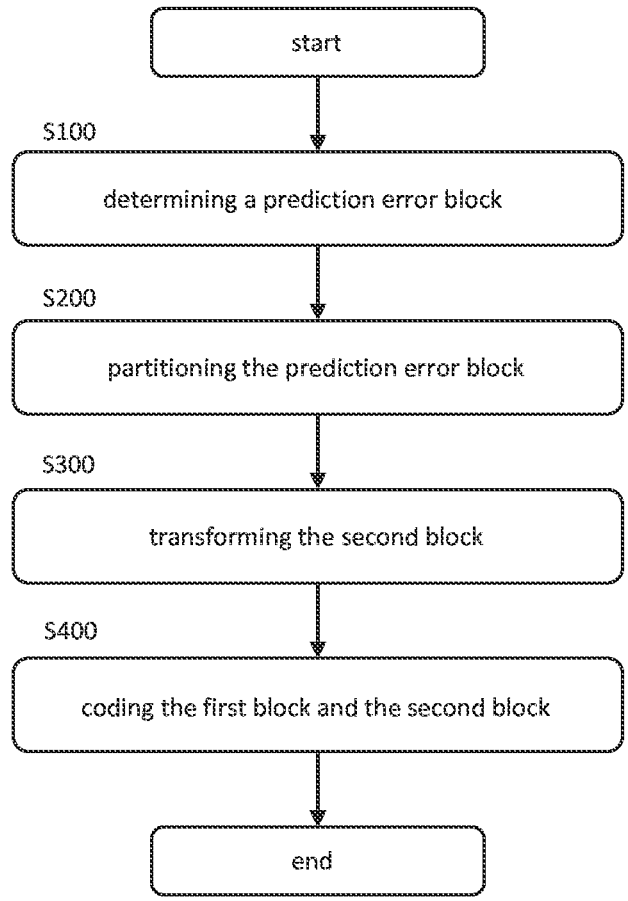
FIG. 5 shows the steps of a coding method according to an embodiment.
Figure 6:
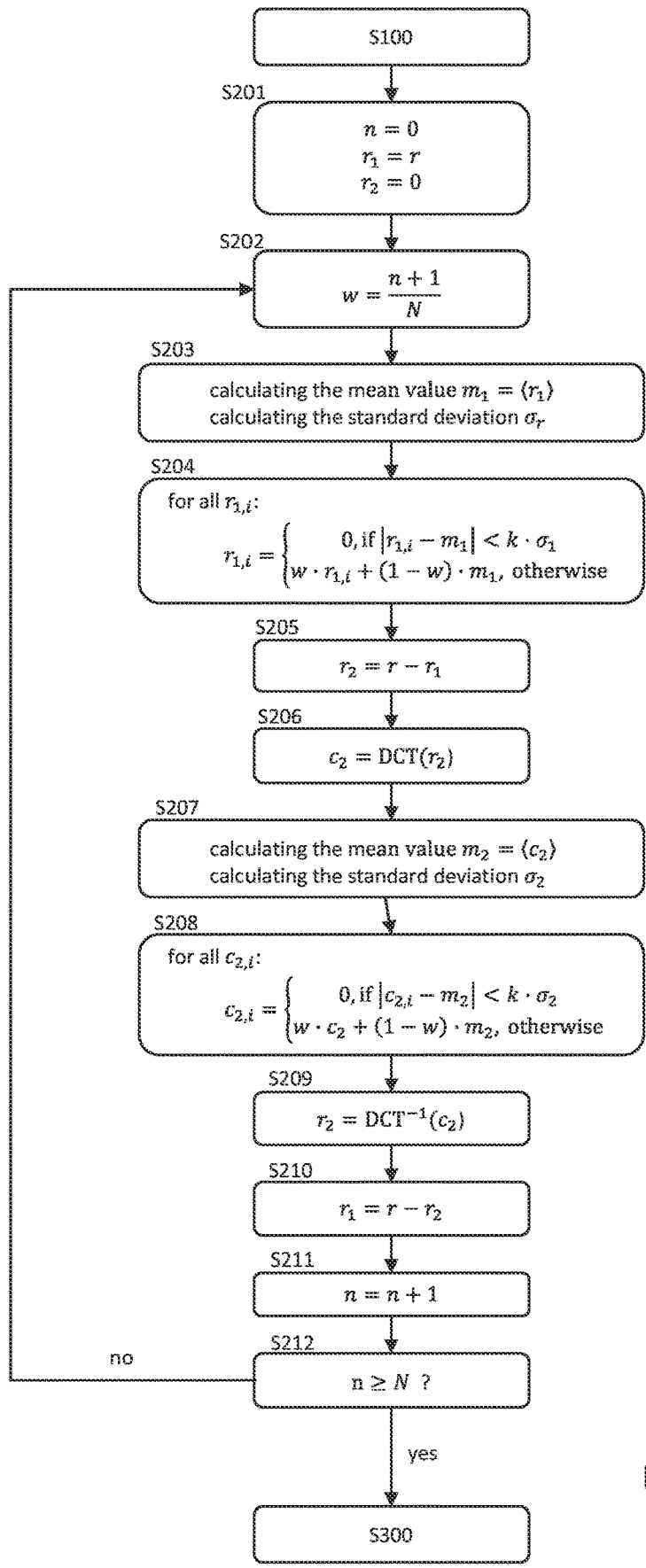
FIG. 6 shows an example of the steps of an implementation of the partitioning of a prediction error block into a first block and a second block.

An example of a possible implementation of the partitioning of the prediction error block on prediction error values is shown in FIGS. 5 and 6.

In step S100, a prediction error block containing prediction errors of a block of the image data is determined. In step S200, the determined prediction error block is split into a linear combination containing a first block of first prediction errors and a second block of second prediction errors. In step S300, the second block is transformed and in step S400 the first block and the transformed second block are coded. The coding of the first block and the second block can involve quantization thereof.

FIG. 6 shows an example of a specific implementation of the partitioning of the prediction error block into the first and the second block. In FIG. 6 and the following description, $r_1$ and $r_2$ denote all prediction errors, respectively of first block and second block; $r_{1,i}$ and $r_{2,i}$ respectively designate the individual prediction errors of the first and second block; $c_2$ designates all (transformed) prediction errors of a transformed second block and $c_{2,i}$ its individual (transformed) prediction parameters; n designates an iteration parameter and N its limit value, i.e., the number of iterations performed. A parameter k is also specified. For example, N is preferably in the range from 5 to 10 and k in the range from 1 to 2.

In step S201, initial values of the first prediction errors of the first block are set equal to the prediction errors of the prediction block, and initial values of the second prediction errors of the second block are set equal to zero. In addition, the iteration parameter n is set to zero.

In step S202, a weight w is determined based on iteration parameter n.

In step S203, a first mean value and a first standard deviation of the first prediction errors of the first block are determined.

In step S204, prediction errors of the first block for which the absolute value of the difference from the first mean value is less than the first standard deviation multiplied by k are updated to zero. In addition, first prediction errors of the first block for which the absolute value of the difference from the first mean value is not less than the first standard deviation multiplied by k are updated to a weighted sum of the respective first prediction errors and the first mean value. The weights are there the previously determined weight w and (w−1).

In step S205, the second prediction errors are updated by forming the difference between the prediction errors of the prediction error block and the updated prediction errors of the first prediction block.

In step S206, the updated second block is transformed to obtain transformed second block $c_2$.

In step S207, a second mean value and a second standard deviation of the second prediction errors of the transformed second block are determined.

In step S208, prediction errors of the transformed second block for which the absolute value of the difference from the second mean value is less than the second standard deviation multiplied by k are updated to zero In addition, second prediction errors of the second block for which the absolute value of the difference from the second mean value is not less than the second standard deviation multiplied by k are updated to a weighted sum of the respective second prediction errors and the second mean value. The weights are there previously determined weight w and (w−1).

In step S209, an updated second block is obtained by inverse-transforming the updated transformed second block.

In step S205 the first prediction errors are updated by forming the difference between the prediction errors of the prediction error block and the updated prediction errors of the second prediction block.

In step S211, the iteration parameter is incremented by 1.

If it is determined in step S212 that the iteration parameter is less than a predetermined limit value, then a next iteration is initiated starting with step S202. However, if the iteration parameter is equal to or greater than the limit value, then the partitioning of the prediction block is complete.

In other words, in the partitioning method shown, the partitioning is performed iteratively, where a weight that is used for updating the first prediction errors and the second prediction errors is incremented at each iteration step.

The method shown in FIG. 6 comprises minimizing the sum of the absolute values of the first prediction errors of the first block and minimizing the sum of the absolute values of the transformed prediction errors of the transformed second block.

However, the method of the present invention is not restricted to the method presented for partitioning the prediction parameter. Other methods can instead be used.

For example, the sum of the absolute values of the first prediction errors of the first block and the sum of the absolute values of the second prediction errors of the second block could be used by a non-linear optimization method. For example, the sum of the squares of the absolute values could also be minimized with the aid of an adaptation according to the method of non-linear least mean square. In this case, for example, the secondary condition can apply that the sum of the first block and the second block yields the prediction errors of the prediction error block.

Figure 7A:
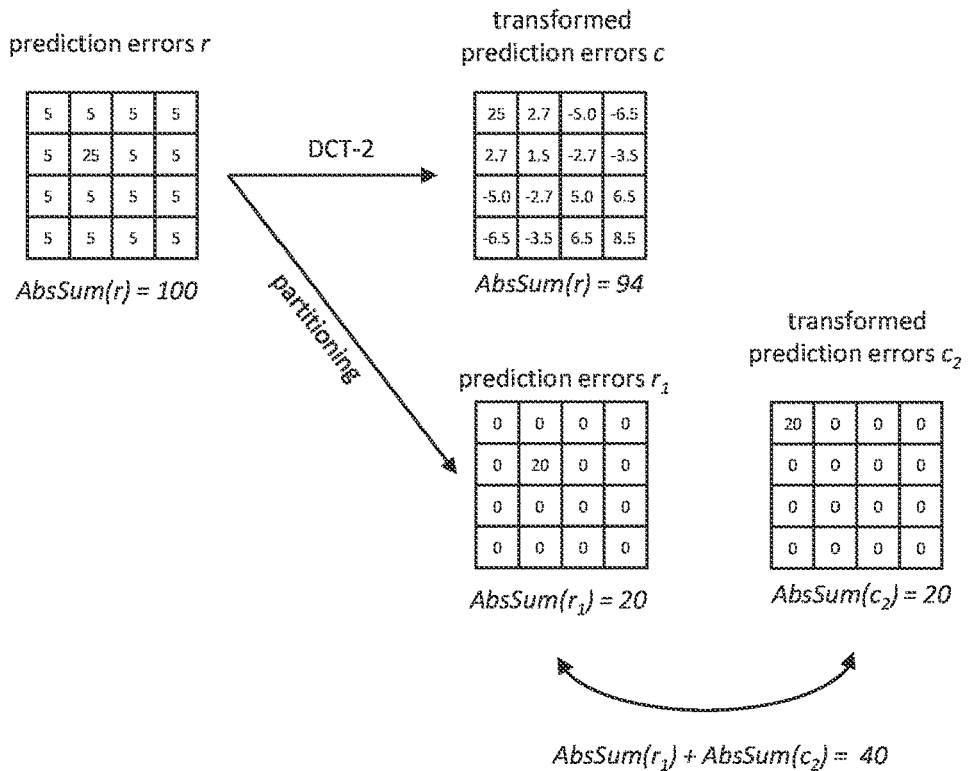
FIG. 7A shows an example of a result of a partitioning of a prediction error block according to an embodiment.

FIG. 7A shows an example of the result of the partitioning according to the method illustrated in FIG. 6 with a total of seven iterations (N=7) and k=1 for the prediction error block of example 3 in FIG. 2A. It becomes clear from the illustration that the sum of the values AbsSum for the first block and the transformed second block after partition is less than the value AbsSum of the directly transformed prediction error r, so that $AbsSum(r_1) + AbsSum(c_2) < AbsSum(c)$ is true.

Figure 7B:
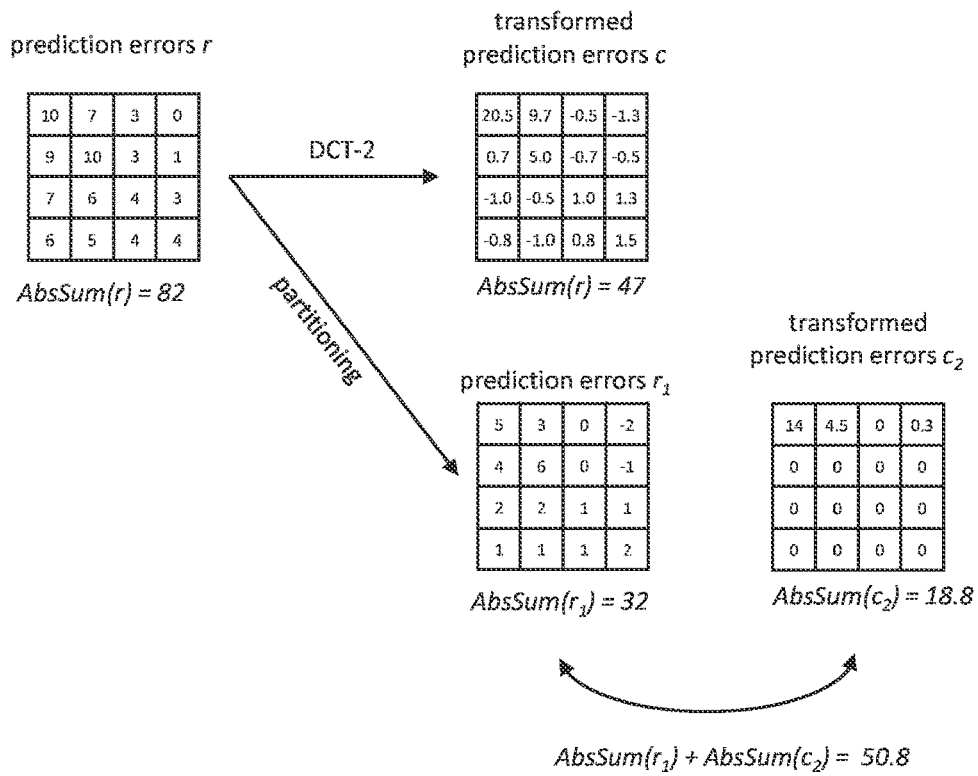
FIG. 7B shows a further example of a result of a partitioning of a prediction error block according to an embodiment.

FIG. 7B shows a further example of a result of the partitioning according to the method shown in FIG. 6 with seven iterations and another example of prediction error block r. As can be seen from the figure, the direct transform of prediction error block r yields a transformed prediction error block c with a value AbsSum of 47. The first block and the transformed second block after partitioning have values AbsSum of 32 and 18.8, respectively. In total, a value AbsSum of 50.8 is yielded, which is obtained through the partitioning and the subsequent transform of the second block. However, this value is above the value AbsSum of directly transformed prediction error block c, i.e. $AbsSum(r1) + AbsSum(c2) > AbsSum(c)$.

This means that the partitioning and subsequent transform of the second block does not in all possible cases lead to a reduction in the data rate required for coding. For this reason, the partitioning and subsequent transform of the second block in a preferred embodiment can be carried out when a reduction in the data rate is achieved thereby.

For example, the Lagrangian costs of the data rate and the mean squared reconstruction error can be determined for the following three coding options:
- coding of $r_1$ and $c_2$ as determined by the partitioning algorithm,
- coding of $r_1$=r and $c_2$=0
- coding of $r_1$=0 and $c_2$ as a result of the transform of $r_2$=r.

The one with the lowest Lagrangian costs can be selected from the three coding options.

Figure 8:
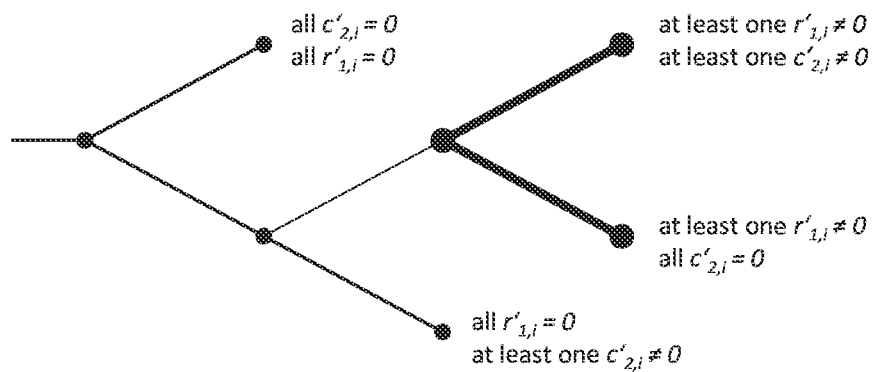
FIG. 8 shows a binary decision tree according to a preferred embodiment.

A quantized prediction error block often contains quantized elements (prediction errors or transformed prediction errors) that are all zero. This information can be coded using a binary decision tree. FIG. 8 shows such a binary decision tree according to a preferred embodiment for the four possible combinations of the prediction errors of first block $r_1$ and transformed second block $c_2$. This decision tree is based on the decision tree used in the emerging VVC standard (Bross et al. see above). Blocks that have at least one non-zero element (prediction error) are entropy coded. The thin lines in FIG. 8 show the decision tree according to the emerging VVC standard, while the bold lines show an extension according to a preferred embodiment.

The method described above was implemented in the test model VTM-8.0 (Joint Video Experts Team (JVET) of ITU-T SG 16 WP 3 and ISO/IEC JTP 1/SC 29/WG 11, "VTM-8.0", https://vcgit.hhi.fraunhofer.de/jvet/VVCSoftware_VTM/-/tags/VTM-8.0, 2020) and the average reduction of the data rate for different test sequences with the same luminance PSNR (peak signal-t-noise ratio) was measured according to typical test model conditions (F. Bossen et al.: "JVET common test conditions and software reference configurations for SDR video", document JVET-N1010, 14th Meeting of the Joint Video Experts Team (JVET) of ITU-T SG 16 WP 3 and ISO/IEC JTC 29/WG 11, Geneva, 2019). Table 1 gives an overview of the average data rate reduction in %.

The sequences represent predefined video sequences that are typically used for coding test purposes. In the "all Intra" mode, only intra-predictions are carried out for all frames of the video sequence, whereas in the "random access" mode, motion compensation can be carried out by inter-prediction with regard to corresponding reference images.

TABLE 1

Average data rate reduction in %

| sequence | all intra | random access |
| --- | --- | --- |
| Tango2 | 0.88 | 0.01 |
| Campfire | 0.79 | 0.44 |
| Cactus | 0.10 | 0.17 |
| BasketballDrive | 0.14 | 0.05 |
| BQTerrace | 0.13 | 0.22 |
| BasketballDrill | 0.32 | 0.27 |
| BQMall | 0.15 | 0.12 |
| PartyScene | 0.32 | 0.42 |
| RaceHorses (WVGA) | 0.15 | 0.08 |
| Basketball Pass | 0.30 | 0.11 |
| BQSquare | 0.17 | 0.37 |
| BlowingBubbles | 0.18 | 0.24 |
| RaceHorses (WQVGA) | 0.18 | 0.07 |
| BasketballDrillText | 0.44 | 0.34 |
| ArenaOfValor | 0.25 | 0.20 |
| SlideEditing | 1.16 | 1.24 |
| SlideShow | 0.25 | 0.25 |
| Console | 0.77 | 0.33 |
| Desktop | 0.98 | 0.49 |
| FlyingGraphics | 0.36 | 0.35 |
| Map | 0.35 | 0.48 |
| Programming | 1.16 | 1.39 |
| Robot | 0.33 | 0.21 |

It can be seen from Table 1 that the method of the present invention enables a reduction in the data rate for all sequences. The reduction in the required data rate is up to 1.39% in the examples given.

Figure 9:
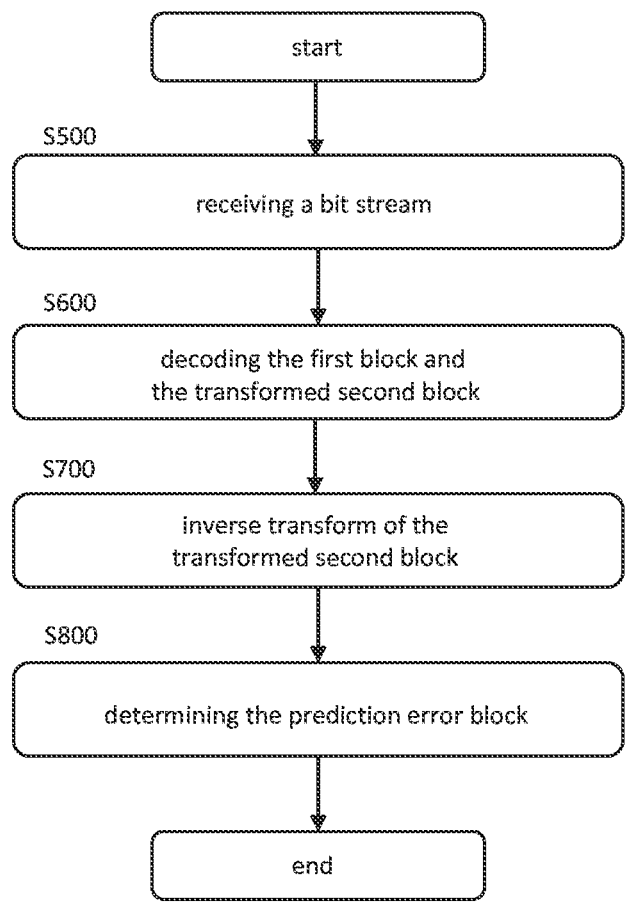
FIG. 9 shows the steps of a decoding method according to an embodiment.

FIG. 9 shows a decoding method according to an embodiment. In step S500, a bit stream containing a coded first block of first prediction errors and a coded second block of second prediction errors is received. In step S600, the first block and the transformed second block are decoded. In step S700, the transformed second block is subsequently inverse-transformed. In step S800, a prediction error block containing prediction errors of a block of image data is determined by a linear combination, where the linear combination contains the first block and the inverse-transformed second block.

For example, the linear combination can be done through a sum of the prediction parameters of the first block and the prediction parameters of the inverse-transformed second block. However, the present invention is not restricted thereto and, for example, a weighted sum can be used for linear combination.

A decoder according to an embodiment is configured to carry out the method illustrated in FIG. 9. In particular, the decoder comprises a unit for obtaining a bit stream containing the coded first block of first prediction error data and a coded transformed second block of second prediction errors. Furthermore, the decoder comprises a unit for decoding the first block and the transformed second block. The unit for decoding can correspond to the unit for coding of an encoder, where inverse decoding that is inverse to the coding is carried out. The decoder also comprises a unit for inverse transform of the transformed second block, in correspondence to unit IT for inverse transform of the encoder. In addition, the decoder comprises a unit for determining a prediction error block, containing prediction errors of a block of the image data, by a linear combination containing the first block and the second block. The unit for determining the prediction error block therefore carries out processing which reverses the partitioning of the prediction error block into the first block and the second block and which is carried out by the encoder.

Figure 10:
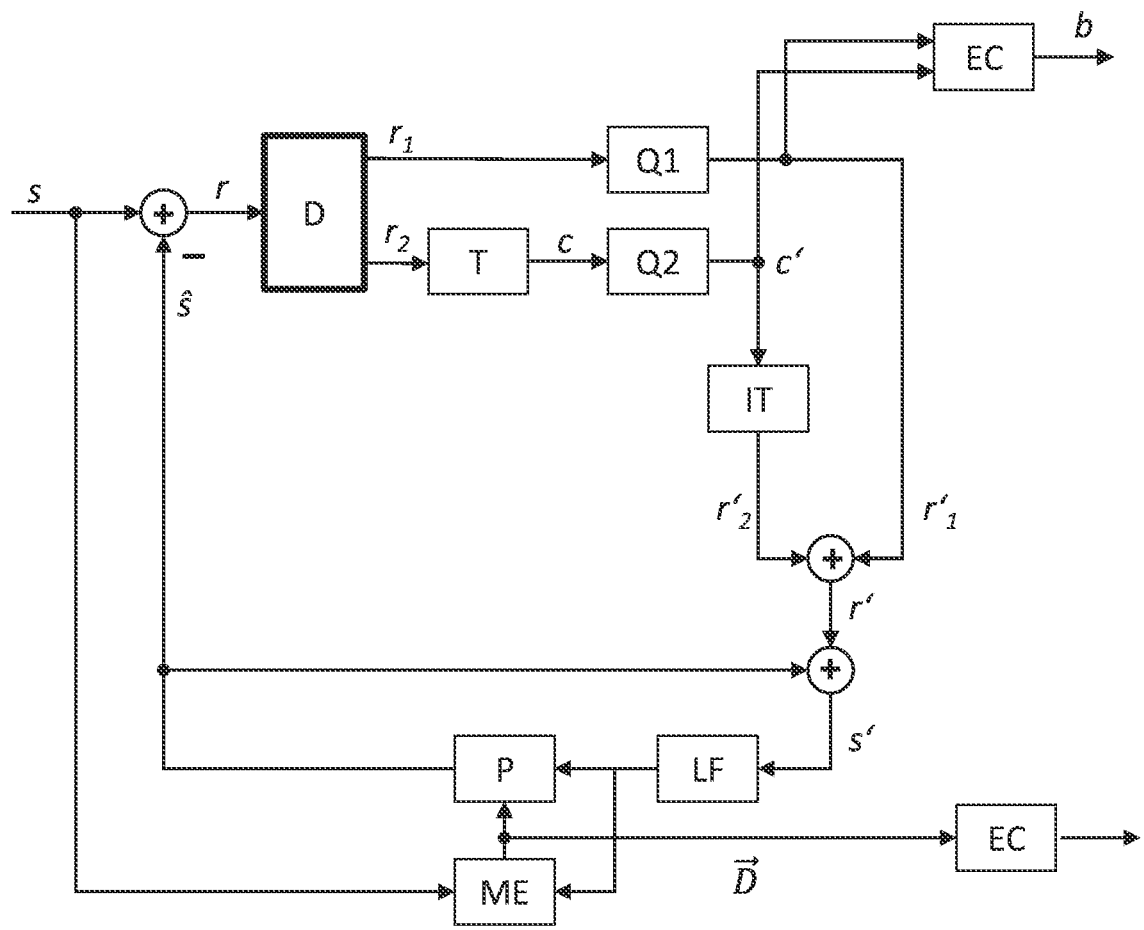
FIG. 10 shows the steps of a coding method and the corresponding functional units according to a further embodiment.

An encoder according to the invention has been described with reference to FIG. 4. However, the present invention is not restricted to such an encoder. FIG. 10 shows a further embodiment of an encoder. The functions of the units correspond to the units of the encoder shown in FIG. 1 and FIG. 4 with the same designation. The encoder according to FIG. 10 differs from the encoder shown in FIG. 4 in particular by the additional option of using different quantization units Q1 and Q2 for first block $r_1$ and second block $r_2$. First block $r_1$ is fed directly to unit Q for first quantization, whereas second block $r_2$ is first transformed by unit T for transform before transformed second block c is fed to unit Q2 for quantization.

Both of the quantized blocks, i.e. block $r_1$ directly quantized by first quantization unit Q1 as well as transformed block c' quantized by the second quantization unit, are coded by unit EC for entropy coding. Inverse-transformed prediction error block r' results as the sum of inverse-transformed first block $r'_2$ and the quantized first block. Prior to the summation, the respective inverse quantizations can be performed in respective inverse quantization units $Q1^{-1}$ and $Q2^{-1}$ of both blocks. An inverse quantization is to be carried out in particular if the quantization contained a scaling and/or an offset which is reversed during the inverse quantization. If the quantization is performed only by reducing the bit depth by rounding the prediction errors, inverse quantization may possibly not be necessary.

In other words, even if the same unit Q was used in the figures above for coding with transform and for coding without transform, this is not absolutely necessary. Different quantizers Q1 and Q2 can instead also be used, as shown in FIG. 10, where, for example, Q1 is adapted for the quantization of the signal which is coded without transform and Q2 is adapted for the quantization of the signal which is coded with transform. The differences can be, for example, in the positions of the representative values which must be different due to different probabilities of the signals respectively to be quantized. Due to the adapted quantization, the data rate can be further reduced while the quality is the same. For example, the adaptation can exploit the perceptual properties of the human eye which differ in dependence of whether a transform is used or not. The adaptation can be, for example, a separately adjustable step width. However, the adaptation can also be such that, for example, Q1 is a scalar quantizer and Q2 a vector quantizer, or vice versa. Since, in the case of coding without transform, there is often only one non-zero prediction error present in a block, a scalar quantizer is often of similar coding efficiency as a vector quantizer for quantization of this signal and is therefore more advantageous. In the case of coding with transform, there are often several non-zero prediction error coefficients present in a block so that a vector quantizer often has a higher coding efficiency for quantization of this signal. In addition, the quantizers can also quantize in dependence of a state, and the selection of the states used can differ. In addition, quantizer Q1 can further be selected in dependence of whether the bit stream contains only the first block or whether the second block is also contained. In the same way, quantizer Q2 as well can be selected in dependence of whether the bit stream contains only the second block or whether the first block is also contained. This can lead to a further data rate reduction while having the same quality, since state-dependent quantization is always more efficient than state-independent quantization.

Figure 11:
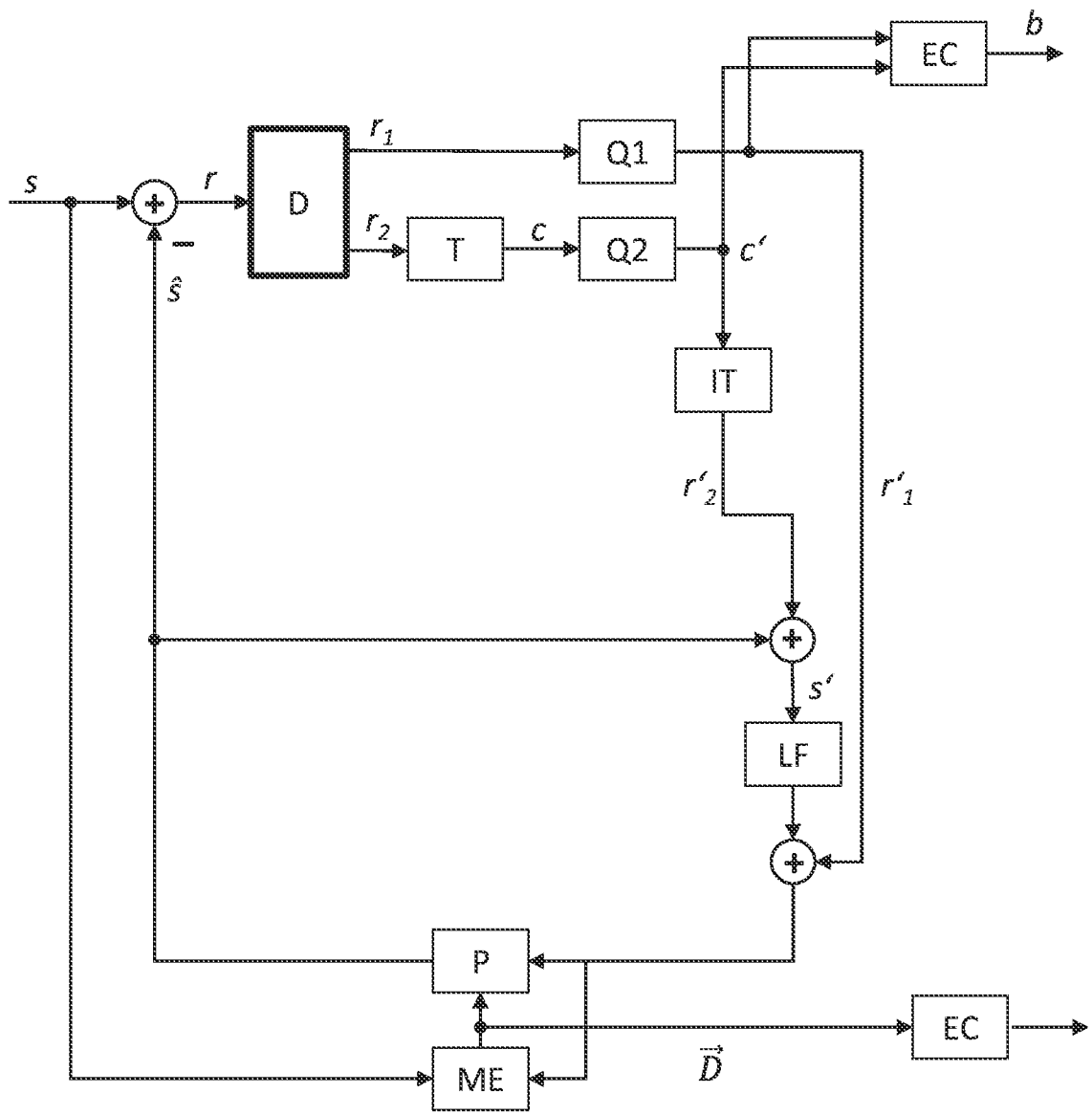
FIG. 11 shows the steps of a coding method and the corresponding functional units according to a further embodiment.

FIG. 11 shows a further exemplary embodiment in which (possibly quantized) sampling values $r_1'$ of the first block are added to reconstruction s' that results after loop filtering. When using several loop filters, (possibly quantized) sampling values $r_1'$ of the first block can also be added to the reconstruction that results after the application of a subset of the loop filters.

Figure 12:
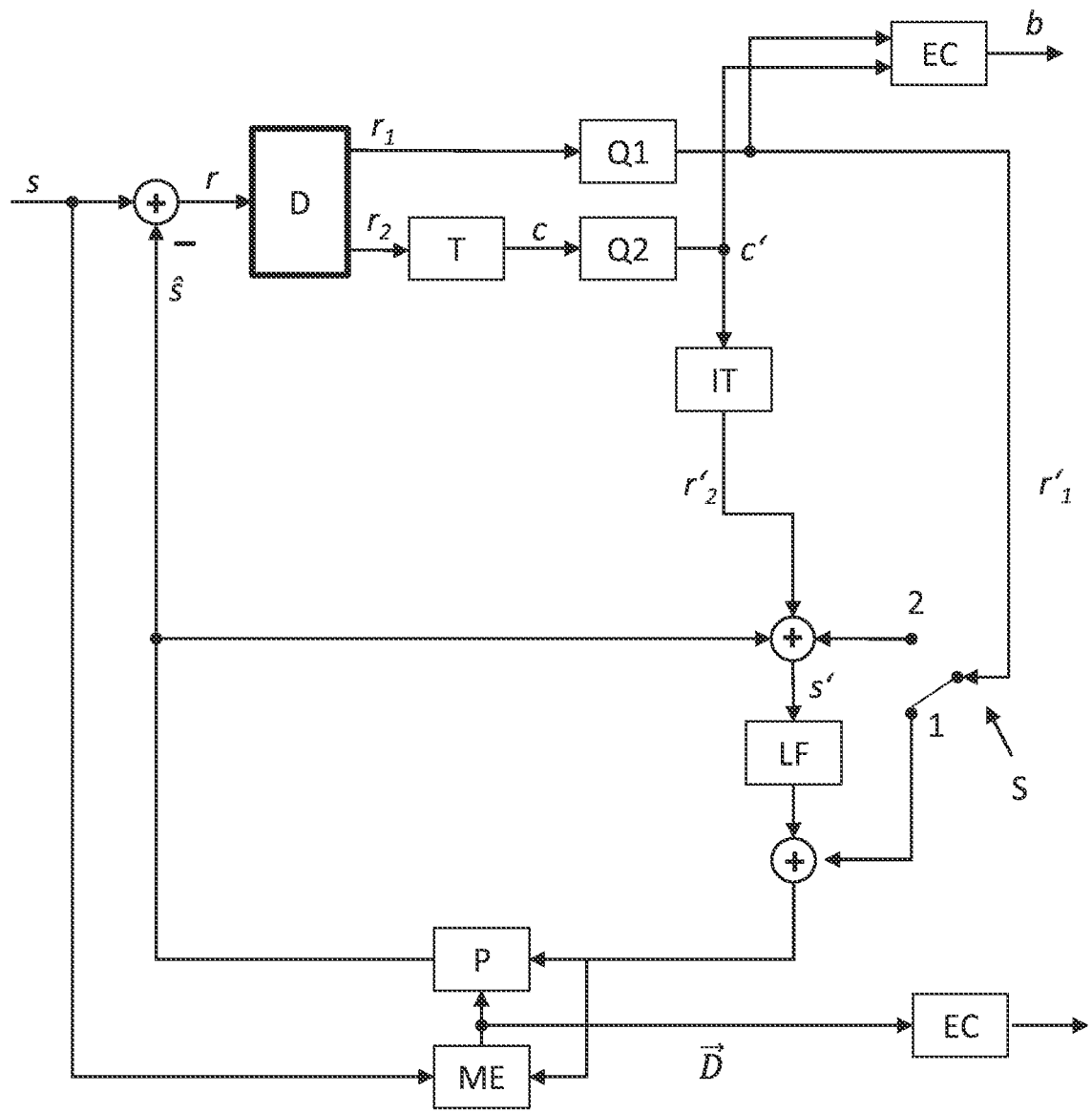
FIG. 12 shows the steps of a coding method and the corresponding functional units according to a further embodiment.

FIG. 12 shows a further exemplary embodiment with an additional switch S. In this embodiment, the (possibly quantized) sampling values of first block $r_1'$ are adaptively added either to inverse-transformed coefficients $r_2'$ (switch position 2) or to reconstruction s' (switch position 1) which results after the loop filtering when using several loop filters, correspondingly also after using a subset of the loop filters.

Generally shown in FIGS. 11 and 12 are quantization units Q1 and Q2. However, as already described with reference to FIG. 4, quantization units Q1 and Q2 can be the same, i.e. the designations Q1 and Q2 in FIGS. 11 and 12 can be replaced by the designation Q. They can also exhibit all further properties that were described in the context of FIG. 4.

Figure 13:
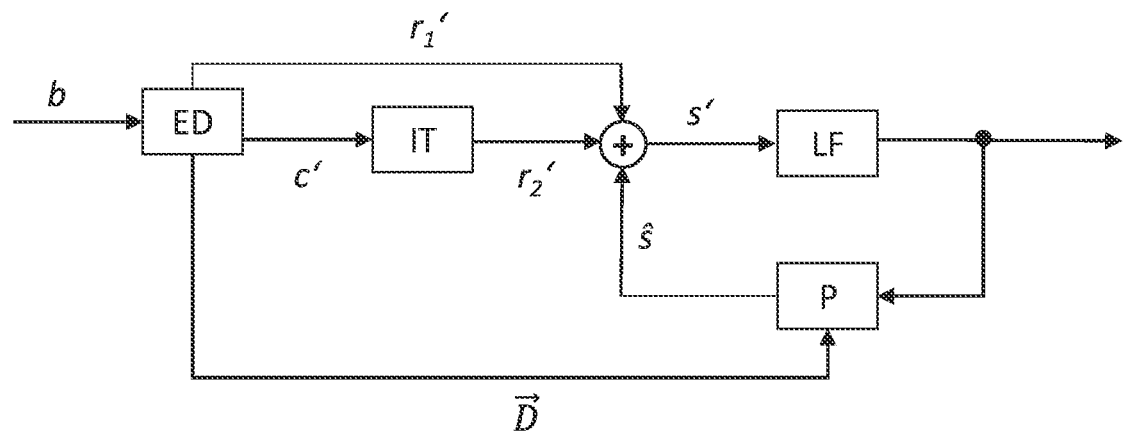
FIG. 13 shows the steps of a decoding method and the corresponding functional units according to an embodiment.

FIG. 13 shows an exemplary embodiment of a decoder in correspondence to the encoder shown in FIGS. 4 and 10. The decoder obtains (e.g.: receives) bit stream b and decodes the coded image data to obtain the image data received.

The decoder there comprises a unit ED for entropy decoding, a unit IT for inverse transformation, and a unit for reconstruction. In addition, the decoder comprises a loop filter unit LF, a unit for prediction P, and possibly a unit for motion estimation. The unit for inverse transformation, the unit for reconstruction, and the loop filter unit can there be identical in their function to the corresponding units of the encoder, as already described above.

The unit for entropy decoding ED is configured to carry out entropy decoding of the data contained in a bit stream for obtaining quantized image data (e.g. prediction errors), coding parameters, prediction parameters, transform parameters, quantization parameters, and/or loop filter parameters. The decoder can receive the image data on a block basis.

Figure 14:
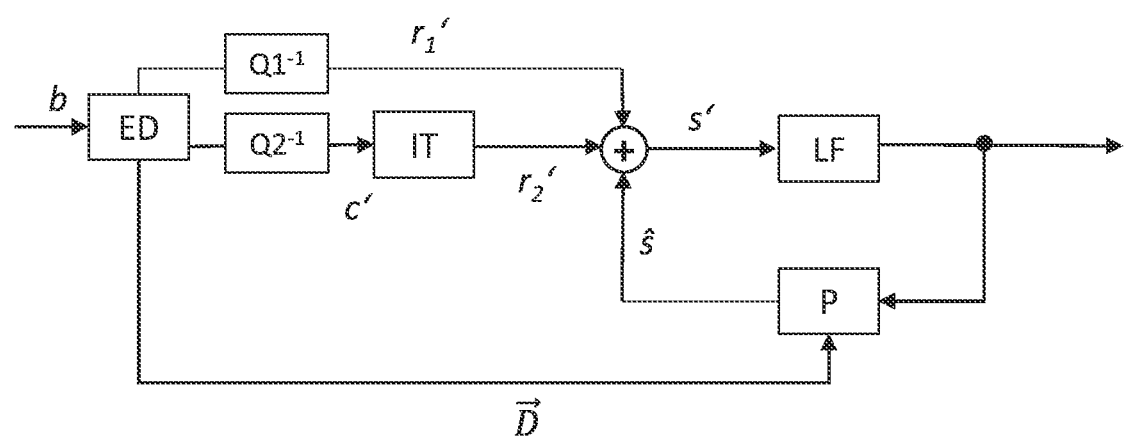
FIG. 14 shows the steps of a decoding method and the corresponding functional units according to a further embodiment.

The decoder can contain no (shown in FIG. 13), one or two (shown in FIG. 14) units for inverse quantization which can be upstream of unit IT for inverse transform. They perform processing inverse to that of units Q for quantization of the encoder. For example, units $Q^{-1}$ or $Q1^{-1}$ and $Q2^{-1}$ can perform scaling and shifting and bit depth enhancement. If adapted quantizers (quantization units) are used, adapted inverse quantizations are respectively used, e.g. adapted to Q1 and Q2. Inverse quantization is often the conversion of a parameter into a representative value. Since this step can also be viewed as decoding, inverse quantization can also be regarded and carried out as part of entropy decoding.

Unit IT for inverse transform carries out an inverse transform of the transform performed by unit T for transform of the encoder. In this way, coefficients c' are transformed back to prediction errors r2'. The unit for reconstruction can be configured to add a prediction block ŝ and decoded first block r1' and second block r2' to obtain a reconstructed block s'.

Loop filter unit LF filters reconstructed block s' to obtain a filtered reconstructed block. Loop filter unit LF can there apply one or more filters, for example, for deblocking or for suppressing noise.

Unit P for prediction carries out the prediction of the block, similarly to what has already been described above for the encoders and the decoder. The motion vectors decoded from the bit stream or determined at the decoder and/or other motion information (e.g. reference image, parameters of an affine transform or the like) can be used there. Decoders corresponding to the encoders in FIGS. 11 and 12 can be obtained by modifying the decoder in FIG. 13 in a similar manner.

Other modifications and embodiments are possible and can be of advantage. For example, the entropy coding or syntax, respectively, of the bit stream can be further improved.

In a first example, the block of quantized coefficients is coded first. Then the block of (possibly quantized) sampling values is coded in dependence of the block of quantized coefficients. Correspondingly, the bit stream can contain the coded coefficients followed by the coded sampling values. Such coding allows for further reduction of the possible redundancy (correlation or generally dependence) between the block of coefficients and the block of sampling values.

For example, the number of quantized non-zero coefficients can be counted. The number can then be compared to a predetermined limit value. The code for coding the block of quantized sampling values is selected in dependence of the outcome of this comparison. In other words, if the counted number of non-zero coefficients exceeds the limit value, a first coding is applied to the sampling values. If the counted number of non-zero coefficients does not exceed the limit value, a second coding is applied to the sampling values. In this case, the second coding can be such that it assumes all quantized sample values to be zero.

For example, the limit value can be 0. The sampling values can therefore be coded with a first coding if not all the coefficients are zero and with a second coding if all the coefficients are zero. The code for coding the information can therefore be selected in dependence of "all quantized sampling values of the block are zero or not" being true. The limit value can be predetermined, for example, determined in advance of the coding by empirical tests. The limit value can also be determined by the encoder and transmitted to the decoder, e.g. per block, per image, or per sequence.

In a second example, the dependence is reversed: The block of (quantized) sampling values is coded first. Then the block of quantized coefficients is coded in dependence of the block of sampling values. The decision regarding the selection of a first code or a second code for coding the quantized coefficients can be made similarly on the basis of a predetermined limit value.

Any remaining redundancies can be used at the decoder (when decoding) to verify correct entropy decoding. Some examples of this are listed below:
  exclusion of some constellations of quantized sampling values in dependence of already quantized coefficients, e.g. the quantized sampling values may not all have the same value if the quantized DC coefficient is unequal to zero and all other quantized coefficients are equal to zero.
  If the decoder determines that the DC coefficient of a block is not zero and all the remaining coefficients of the block are zero, and at the same time all quantized sampling values have the same value, then the decoder outputs an error message. The decoding error can then be treated in a typical/known way (error concealment by interpolation or the like).
  A possible exemplary alternative to this is the following: if the decoder determines that the DC coefficient of a block is not zero and all the remaining coefficients of the block are zero, then no code words are provided in the event that all quantized sampling values have the same value because this event cannot occur. This allows data rate to be saved. In this way, the redundancy is eliminated instead of being used for verification.
  for more efficient redundancy-reducing coding, the valid constellations of the quantized sampling values, i.e. the constellations for which code also words are provided, can be restricted such that adjacent quantized sampling values have different values and/or different signs, which is associated with low correlation. As a result, code words can be saved for constellations for which the transform is often more efficient. "0" can be treated as a sign separate from "+" and "−". A restriction might cause code words to be provided only for constellations of quantized sampling values where all pairs of adjacent sampling values (e.g. adjacent above and to the left in the typical coding and decoding order, or other adjacent one in dependence of the coding and decoding order) in the block always have different values. Another restriction could be that code words are only provided for constellations of quantized sampling values in which all pairs of adjacent sampling values always have one of the sign pairs "+/−", "−/+", "−/0", "0/+", "0/−", "+/0", and "0/0", where "0" is treated as a separate sign from "+" and "−".

Figure 15:
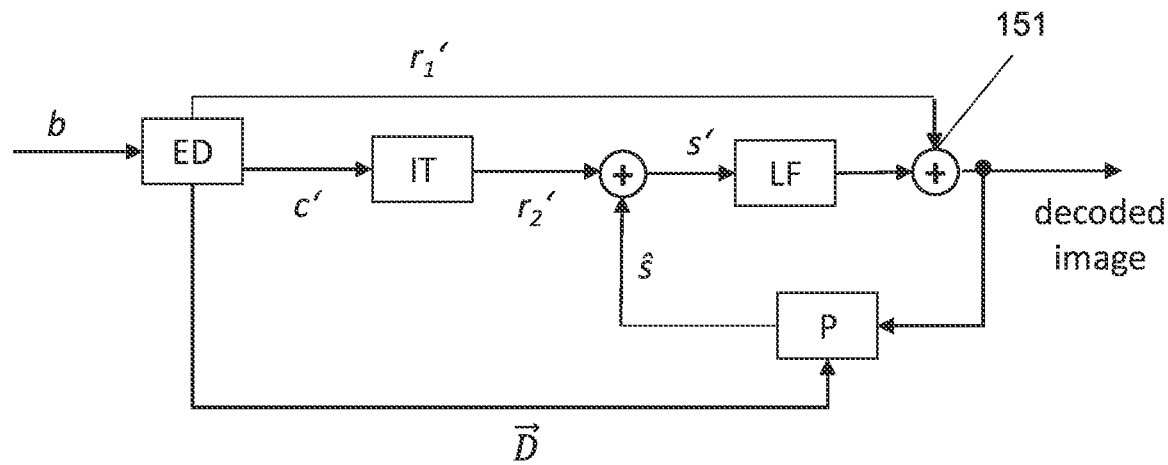
FIG. 15 shows the steps of a decoding method and the corresponding functional units according to an embodiment.
Figure 16:
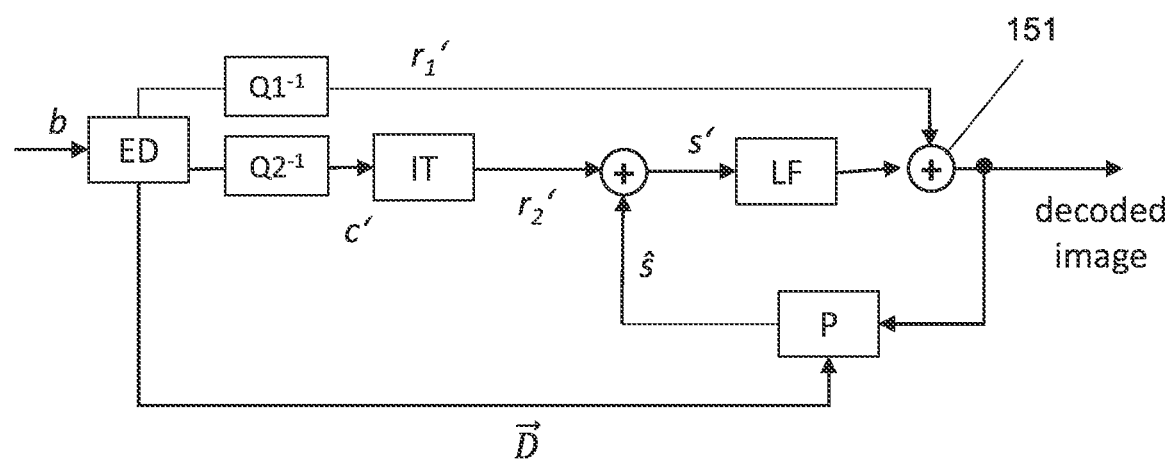
FIG. 16 shows the steps of a decoding method and the corresponding functional units according to an embodiment.
Figure 17:
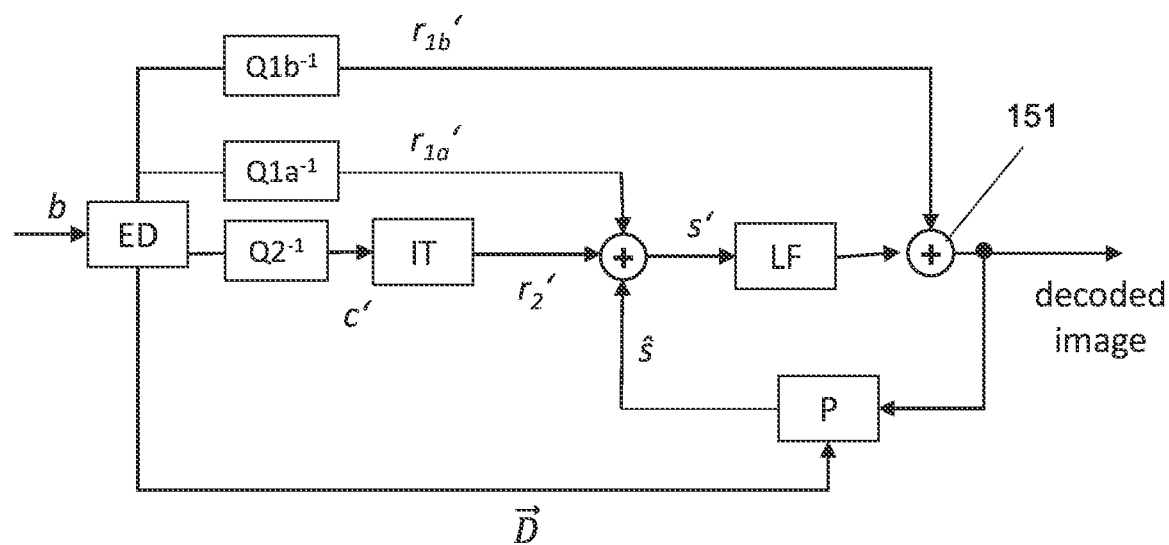
FIG. 17 shows the steps of a decoding method and the corresponding functional units according to an embodiment.

Further exemplary embodiments are illustrated in FIGS. 15 to 17.

FIGS. 15 to 17 show decoding with which it is possible directly in the finally reconstructed image (i.e. after loop filtering LF) at selected locations to correct the image signal sampling-by-sampling by addition (summation) 151 of r1'. It is therefore possible, for example, to correct any quantization errors that remain directly at block boundaries and that subjectively can possibly be disruptive. The positions for which quantized sampling values r1' are added can be coded in dependence of the boundary between two blocks and/or in dependence of with which parameters a loop filter has been applied (e.g. whether deblocking is activated or deactivated). The distance to the block boundary can be used to describe the position FIGS. 15 to 17 differ in the use of inverse quantization. In FIG. 15, a decoder is shown which does not require inverse quantization (e.g. scaling and/or offset). In FIG. 16, a decoder is shown which inversely quantizes (dequantizes) the decoded sampling values and the decoded coefficients with respective inverse quantizers $Q1^{-1}$ and $Q2^{-1}$. Conversions are possible in which, for example, only the coefficients are inverse-quantized. FIG. 17 shows an example in which quantized sample values r1' are additionally available partitioned into r1a' and r1b' on an element basis or on a block basis. Portion r1a' is added prior to loop filtering LF, portion r1b' after loop filtering LF. In this way, the advantages from FIG. 13 and FIG. 15 or from FIG. 14 and FIG. 16 can be combined. The partitioning of r1' into r1a' and r1b' can follow a fixed rule, e.g. r1a'=r1b' =0.5×r1' or the like. However, the division can also be estimated by the encoder and transmitted to the decoder. The encoder can there take into account the effect of one or more LF in the estimation. The partitioning could be, for example, selected from the mean squared reconstruction error and the required data rate while minimizing the Lagrangian costs. The information as to whether the bit stream contains the first block and the transformed second block can be indicated by an encoder by inserting an indicator into the bit stream. On the decoder side, it can be determined based on the indicator that (whether) the bit stream contains the first block and the transformed second block.

According to one embodiment, the indicator is implemented in the bit stream by coded binary information. In one non-restricting embodiment, the binary information can be a bit. However, the coding can also be binary arithmetic coding, as used, for example, by HEVC or VVC. The indicator can therefore indicate two values according to the embodiment, one of which indicates that the bit stream contains the first block and the transformed second block (represented in FIG. 8 by "At least one $r'_{1,i} \neq 0$" and "At least one $c'_{2,i} \neq 0$"), and the other indicates that the bit stream contains the first block and not the transformed second block (represented in FIG. 8 by "At least one $r'_{1,i} \neq 0$" and "All $c'_{2,i} = 0$").

In another embodiment, the indicator is capable of indicating more than two values. This allows multiple coding methods to be indicated. For example, the indicator can be implemented by two bits or two coded pieces of binary information and can there assume four values. These four values can be associated with four coding methods and indicate that the bit stream contains the first block and the transformed second block, the bit stream contains only the first block, the bit stream contains only the transformed second block, and/or the bit stream contains neither the first block nor the transformed second block.

The encoder can entropy-encode this side information, for example, as part of context-adaptive arithmetic coding which can also be binary, or other coding with code words of variable or fixed length.

According to a preferred embodiment, one or more indicators are inserted into the bit stream and indicate whether the methods described above including the partitioning of the prediction error block into the first block and the second block have been applied. In particular, a method of an embodiment can be activated and deactivated in a hierarchical manner, for example, for a video sequence, individual images, individual image areas (such as slices, tiles or bricks) or individual blocks. This can enable more efficient coding of the required side information at a low data rate.

For example, a first indicator can show whether an entire video sequence is coded using the method described or not and therefore no further indicators follow, or whether further indicators follow for parts of the video sequence which indicate for a respective part of the video sequence whether the part of the video sequence is coded with the method described or not.

If the first indicator shows that further indicators follow and that therefore not the entire video sequence is coded with the method described, a second indicator can indicate, for example, for each image whether or not the method described is used to encode the entire image and no further indicators follow, or that further indicators follow which can show whether a part of the image is coded with the method described or not.

In a similar way, further indicators can follow if either the method described above for the respective entire sub-area is used for sub-areas, such as slices, tiles or bricks, or not.

In other words, the bit stream can contain one or more indicators that indicate in a hierarchical manner whether or not respective parts of image data are coded with a method according to an embodiment of the present invention.

In one embodiment, the hierarchical coding can be carried out separately for prediction error coding after inter- and intra-prediction. It can also be done separately for the prediction errors of the luminance and the two chrominances. Further improvement in coding efficiency can thereby be achieved.

According to one embodiment, the methods described are applied with the partitioning of the prediction error block into the first block and the second block in dependence of a size of the prediction error block.

For example, the method can be applied only under the condition that the width of the prediction error block is above a certain minimum width. In addition, the method can be applied only under the condition that the height of the prediction error block is above a certain minimum height. For example, the method can be applied only under the condition that the width of the prediction error block is above a minimum width and the height of the prediction error block is above a minimum height. Alternatively, the method can be applied only under the condition that the product of the width of the prediction error block and the height of the prediction error block is above a certain limit, e.g. a minimum area or a minimum number of sampling points/pixels, respectively.

Since the method is only used when the prediction block has a certain minimum size, the required amount of data for the side information is kept small in relation to the amount of data for the image data. In other words, for small blocks the additionally required side information per pixel is large, for large blocks is rather small. Therefore, the technology could preferably be deactivated for very small blocks and activated for large blocks.

The minimum size, width, and/or area can be predetermined (and possibly specified in a standard) or signaled in the bit stream, for example, once, per image, or per image group, or per block.

However, a partition of the image into small blocks of prediction errors can also be an indication of an inaccurate prediction, in which large non-zero prediction errors arise, for which the coding is very efficient. Furthermore, the division into the first block and the second block entails little computing effort for small blocks and high computing effort for large blocks. It can therefore also be advantageous to use this method only for small blocks. For example, the method can be applied only under the condition that the width of the prediction error block is below a certain minimum width. In addition, the method can be applied only under the condition that the height of the prediction error block is below a certain minimum height. For example, the method can be applied only under the condition that the width of the prediction error block is below a minimum width and the height of the prediction error block is below a minimum height. Alternatively, the method can be applied only under the condition that the product of the width of the prediction error block and the height of the prediction error block is below a certain limit, e.g. a minimum area or a minimum number of sampling points/pixels, respectively.

In general, the partitioning of a block into a linear combination of two blocks according to the invention can only be applied to blocks having a size within a predetermined range. This range can be determined by a minimum size and/or by a maximum size. The size can be indicated by the vertical and/or horizontal dimensions of the block, or by the area, e.g. by the number of sampling values.

According to a further embodiment, a method described is used with partition of the prediction error block into the first block and the second block in dependence of (possibly quantized) transformed prediction errors of the transformed prediction error block. Only when they exhibit a certain property does the bit stream contain an indicator described above (see also FIG. 8) or contain a block of non-transformed prediction parameters, in accordance with the methods described above. Possible properties are:

- the comparison of the number of non-zero (possibly quantized) transformed prediction errors having a limit value satisfies a specific condition. For example, the number of non-zero (possibly quantized) transformed prediction errors is greater than a limit value which can also depend on other parameters, such as the block properties, like the block size, the block area, or an edge length of the block.
- The positions of the non-zero (possibly quantized) transformed prediction errors in the block satisfy a specific condition.
- For example, the specific condition could require that the non-zero (possibly quantized) transformed prediction errors are outside a predetermined range of the transformed prediction error block.
- In one embodiment, the predetermined range can contain at least the upper left sampling value or coefficient, respectively. For example, the predetermined area is the upper left quadrant of the transformed prediction error block. The condition could also stipulate, for example, that the DC coefficient must be non-zero, which in a DCT represents the direct component.
- According to one embodiment, the predetermined range comprises a low-frequency range, i.e. if the non-zero values are outside this range, the prediction error block has high-frequency components or a high variability of the prediction errors over the prediction error block, which implies a low statistical dependence of the prediction values so that a division of the prediction error block into the first block and the second block leads to a reduction in the data rate.
- The sum of the absolute values of the (possibly quantized) transformed prediction errors is above a predetermined limit.

If one or more of the conditions stated are met, it can be assumed that the (possibly quantized) transformed prediction parameters have high values and that inaccurate prediction is therefore given. This would require a high data rate for coding the prediction error block. In this case, the presence of a non-zero second prediction error with low statistical dependencies is very likely so that the required data rate can be reduced by using the methods described above. In addition, the relative data rate (per image point or sampling value) for coding the indicators for such a situation is low.

According to an embodiment of the present invention, an indicator for a block can also be omitted if the bit stream always contains the first block and always the transformed second block. The data rate for the indicator can thus be saved with this procedure. In addition, only a small reduction in quality can be added if one of the blocks was not needed to be included (i.e. would be completely zero), but may not be completely zero due to this convention introduced and is therefore modified in such a way that it is not completely zero.

According to an embodiment of the present invention, one, several, or all of the indicators are coded in dependence of one or more of the following conditions.

For example, the indicators (the indicator) can be coded in dependence of an indicator of an adjacent block of the image data. For example, the code word length of the indicators (the indicator) can be adjusted according to the code word length of the indicators (the indicator) of the adjacent block.

In one embodiment, the coding of the indicators (of the indicator) can be adjusted based on the prediction method of the prediction block. For example, a different code word length of the indicators (of the indicator) can be set in dependence of whether an inter-prediction or an intra-prediction takes place.

In one embodiment, the coding of the indicators (the indicator) can be adjusted based on the component of the image signal. For example, a different code word length of the indicators (of the indicator) can be set in dependence of whether a luminance or a chrominance is coded.

In one embodiment, the first block and the transformed second block can also have different sizes. However, the edge lengths of the first and the second block should be integer multiples of one another for ease of processing. For example, the block size of the first block can have 4×4 sampling values and the block size of the transformed second block can have 8×8 coefficients. For every second block of 8×8 coefficients, up to 4 first blocks of 4×4 sampled values each would arise if they are arranged not overlapping one another but completely overlapping the transformed second block. Up to four indicators would be coded accordingly. However, the invention is not restricted to these specific block sizes.

In one embodiment, the number of non-zero (possibly quantized) sampling values of the first block and the (possibly quantized) coefficients of the transformed second block can be limited. For example, a limitation might require that only the DC coefficient be non-zero. Since in these cases only this one has to be entropy-coded, the data rate can be saved.

In one embodiment, the (possibly quantized) sample values of the first block must meet conditions among each other. For example, a condition can be that not all sampling values may have the same value, since such a block could be coded more efficiently with one transform. The introduction of such conditions can accordingly save data rate.

According to one embodiment, the coding of the indicators (of the indicator) can be adjusted based on the size of the prediction error block. For example, a different code word length of the indicators (of the indicator) can be set in dependence of whether the size of the prediction block is above or below a predetermined limit. The size of the prediction block can relate, for example, to a width, a height, and/or a product of the height and width of the prediction block.

Although the embodiments of the invention have been described based on coding video data, the invention is not restricted thereto but can also be used for coding still images.

Embodiments of the present invention, for example, an encoder or a decoder and their functions can be implemented in hardware, software, firmware, or a combination thereof. When embodiments are implemented in software, the functions can be stored on a computer-readable storage medium or transmitted over a communications channel as instructions or code to be executed by a hardware-based processing unit. For example, a computer-readable storage medium can be RAM, ROM, EEPROM, CD-ROM, or other optical storage medium, a magnetic storage medium, flash memory, or other storage medium that can be used to store program code in the form of instructions such that they can be read by a computer.

Instructions can be executed by one or more processors, such as digital signal processors (DSP), general purpose microprocessors, application-specific integrated circuits, field-programmable gate arrays (FPGAs), or other integrated or discrete logic circuits. Accordingly, the term "processor" can refer to any of the structures mentioned or other structures suitable for implementing the methods described above. In addition, the functionalities described can be implemented in hardware and/or software modules provided for this purpose which are configured to code and/or decode image data, also as part of a combined codec. The methods can also be implemented in one or more circuits or logic elements.

In summary, the present invention relates to methods and devices for coding image data, where a prediction error block is partitioned into an element-wise linear combination. The prediction error block contains prediction errors of a block of image data. The linear combination then contains a first block of first prediction errors and a second block of second prediction errors. The second block is transformed and coded together with the first block. The invention additionally relates to methods and devices for decoding image data, where a bit stream contains a first block of prediction errors and a transformed second block of second prediction errors. Following an inverse transform of the transformed second block, a prediction error block is determined by a linear combination containing the first block and the inverse-transformed second block.

The invention claimed is:

1. A method for coding image data, comprising:
    determining a prediction error block containing prediction errors of a block of image data;
    partitioning said prediction error block into an element-wise linear combination that comprises a first block of first prediction errors and a second block of second prediction errors, wherein said first prediction errors have lower statistical dependencies among each other than said second prediction errors, at least one prediction error is obtained by a linear combination of a first non-zero prediction error and a second non-zero prediction error, and said prediction error block, said first block, and said second block each have a same size;
    transforming said second block;
    coding said first block and said transformed second block;
    inserting said coded first block and said coded transformed second block into a bit stream; and
    inserting into said bit stream an indicator capable of indicating that said bit stream contains said coded first block and said coded transformed second block.

2. The method according to claim 1, wherein
    a sum of said first prediction errors and said second prediction errors yields the corresponding prediction errors of said prediction error block.

3. The method according to claim 1, wherein
    partitioning of said prediction error block comprises minimizing a sum of absolute values of said first prediction errors of said first block.

4. The method according to claim 1, wherein
    partitioning of said prediction error block comprises minimizing a sum of absolute values of said transformed prediction errors of said transformed second block.

5. The method according to claim 1, wherein
    said indicator is further capable of indicating that said bit stream contains only said coded first block, only said coded transformed second block, or none of said coded first block and said coded transformed second block.

6. A method for decoding image data, comprising:
    receiving a bit stream containing a coded first block of first prediction errors and a coded transformed second block of second prediction errors, wherein said first prediction errors have lower statistical dependencies among each other than said second prediction errors;
    decoding said first block and said transformed second block;
    inverse-transforming said transformed second block; and
    determining a prediction error block containing prediction errors of a block of image data by an element-wise linear combination containing said first block and said inverse-transformed second block, wherein at least one prediction error is obtained by a linear combination of a first non-zero prediction error and a second non-zero prediction error and said prediction error block, said first block, and said second block each have a same size;
    wherein said bit stream further contains an indicator capable of indicating that said bit stream contains said coded first block and said coded transformed second block.

7. The method according to claim 6, wherein
    said linear combination contains a sum of said first block and said inverse- transformed second block.

8. The method according to claim 6, furthermore comprising:
    determining that said bit stream contains said coded first block and said coded transformed second block.

9. The method according to claim 6, wherein the method further comprises:
    determining based on said indicator that said bit stream contains said coded first block and said coded transformed second block.

10. The method according to claim 9, wherein
    said indicator is further capable of indicating that said bit stream contains only said coded first block, only said coded transformed second block, or none of said coded first block and said coded transformed second block,
    said linear combination contains a weighted sum of said first block and said second block, and
    weights of the weighted sum are determined based on said indicator.

11. A device for coding image data, comprising:
    a device configured to determine a prediction error block containing prediction errors of a block of image data;
    a device configured to partition said prediction error block into an element-wise linear combination comprising a first block of first prediction errors and a second block of second prediction errors, where at least one prediction error is obtained by a linear combination of a first non-zero prediction error and a second non-zero prediction error, said first prediction errors have lower statistical dependencies among each other than said second prediction errors, and said prediction error block, said first block, and said second block each have a same size;
    a device configured to transform said second block; and
    a device configured to code said first block and said transformed second block inserting said coded first block and said coded transformed second block into a bit stream; and
    inserting into said bit stream an indicator capable of indicating that said bit stream contains said coded first block and said coded transformed second block.

12. A device for decoding image data, comprising:
- a device configured to receive a bit stream containing a coded first block of first prediction errors and a coded transformed second block of second prediction errors, wherein said first prediction errors have lower statistical dependencies among each other than said second prediction errors;
- a device configured to decode said first block and said transformed second block;
- a device configured to inverse-transform said transformed second block;
- a device configured to determine a prediction error block, containing prediction errors of a block of said image data, by an element-wise linear combination containing said first block and said second block, wherein said prediction error block, said first block, and said second block each have a same size and at least one prediction error is obtained by a linear combination of a first non-zero prediction error and a second non-zero prediction error:
- wherein said bit stream further contains an indicator capable of indicating that said bit stream contains said coded first block and said coded transformed second block.

* * * * *

UNITED STATES PATENT AND TRADEMARK OFFICE
CERTIFICATE OF CORRECTION

| | |
|---|---|
| PATENT NO. | : 12,356,011 B2 |
| APPLICATION NO. | : 18/012072 |
| DATED | : July 8, 2025 |
| INVENTOR(S) | : Matthias Narroschke |

Page 1 of 1

It is certified that error appears in the above-identified patent and that said Letters Patent is hereby corrected as shown below:

In the Claims

Column 26, Line 60, Claim 11, delete "block; and" and insert -- block; --

Column 27, Line 20, Claim 12, delete "error:" and insert -- error; --

Signed and Sealed this
Sixteenth Day of September, 2025

Coke Morgan Stewart
*Acting Director of the United States Patent and Trademark Office*